(12) United States Patent
Lee et al.

(10) Patent No.: US 12,710,681 B2
(45) Date of Patent: Aug. 18, 2026

(54) LIGHT MODULATION ELEMENT, BEAM STEERING DEVICE INCLUDING THE SAME, AND ELECTRONIC DEVICE INCLUDING BEAM STEERING DEVICE

(71) Applicant: SAMSUNG ELECTRONICS CO., LTD., Suwon-si (KR)

(72) Inventors: Duhyun Lee, Yongin-si (KR); Sunil Kim, Osan-si (KR); Junghyun Park, Seoul (KR); Changgyun Shin, Anyang-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1337 days.

(21) Appl. No.: 17/365,674

(22) Filed: Jul. 1, 2021

(65) Prior Publication Data

US 2022/0011642 A1 Jan. 13, 2022

(30) Foreign Application Priority Data

Jul. 7, 2020 (KR) ........................ 10-2020-0083604
Mar. 11, 2021 (KR) ........................ 10-2021-0031784

(51) Int. Cl.
*G02F 1/29* (2006.01)
*B82Y 20/00* (2011.01)
(Continued)

(52) U.S. Cl.
CPC ................ *G02F 1/29* (2013.01); *G01S 17/02* (2013.01); *G01S 17/89* (2013.01); *G01S 17/894* (2020.01);
(Continued)

(58) Field of Classification Search
CPC ................. G02F 1/29; G02F 2202/101; G02F 2202/105; G02F 2202/108; G02F 2202/36; G02F 2203/24; G02B 26/08
See application file for complete search history.

(56) References Cited

U.S. PATENT DOCUMENTS 6,472,682 B1 * 10/2002 Kuramoto ........... G02F 1/01708 257/14
7,683,308 B2 3/2010 Charbon et al.
(Continued)

FOREIGN PATENT DOCUMENTS

EP 3454113 A1 * 3/2019 ............. G02B 26/08
EP 3470912 A1 * 4/2019 ........... G02F 1/0151
(Continued)

OTHER PUBLICATIONS

Rutckaia et al. “Quantum dot emission driven by MIE resonances in silicon nanostructures” Nano letters 2017, 17, 6886-6892 (Year : 2017).*
(Continued)

*Primary Examiner* — Tina Wong
(74) *Attorney, Agent, or Firm* — Sughrue Mion, PLLC

(57) ABSTRACT

Provided is a light modulation element including a first contact layer, a second contact layer, an active layer provided between the first contact layer and the second contact layer, a first contact plug provided between the first contact layer and the active layer, and a second contact plug provided between the second contact layer and the active layer, wherein a width of at least one of the first contact plug and the second contact plug is less than a width of the active layer.

34 Claims, 18 Drawing Sheets

(51) Int. Cl.

| | |
|---|---|
| ***G01S 17/02*** | (2020.01) |
| ***G01S 17/89*** | (2020.01) |
| ***G01S 17/894*** | (2020.01) |
| ***G02B 26/08*** | (2006.01) |

(52) U.S. Cl.

CPC .............. *G02B 26/08* (2013.01); *B82Y 20/00* (2013.01); *G02F 2202/101* (2013.01); *G02F 2202/105* (2013.01); *G02F 2202/108* (2013.01); *G02F 2202/36* (2013.01); *G02F 2203/24* (2013.01)

(56) References Cited

U.S. PATENT DOCUMENTS

| | | | | |
|---|---|---|---|---|
| 7,719,029 | B2 * | 5/2010 | Itzler | H10F 77/959 257/481 |
| 8,040,586 | B2 | 10/2011 | Smith et al. | |
| 8,767,190 | B2 | 7/2014 | Hall | |
| 9,110,158 | B2 | 8/2015 | Habif | |
| 9,632,216 | B2 | 4/2017 | Han et al. | |
| 9,817,250 | B2 * | 11/2017 | Han | G02F 1/015 |
| 10,132,928 | B2 | 11/2018 | Eldada et al. | |
| 10,444,355 | B2 | 10/2019 | Pala et al. | |
| 10,613,410 | B2 | 4/2020 | Hosseini et al. | |
| 11,035,548 | B2 | 6/2021 | Han et al. | |
| 2002/0121499 | A1 | 9/2002 | Bradley et al. | |
| 2008/0001538 | A1 * | 1/2008 | Cok | H05B 33/22 313/506 |
| 2014/0232827 | A1 | 8/2014 | Kumar et al. | |
| 2016/0209499 | A1 | 7/2016 | Suzuki | |
| 2017/0180658 | A1 | 6/2017 | Choi et al. | |
| 2017/0301716 | A1 | 10/2017 | Irish et al. | |
| 2018/0031681 | A1 | 2/2018 | Yoon et al. | |
| 2018/0059505 | A1 | 3/2018 | Kyoung et al. | |
| 2018/0138593 | A1 * | 5/2018 | Nakazawa | H10D 86/423 |
| 2019/0018299 | A1 | 1/2019 | Park et al. | |
| 2019/0107740 | A1 | 4/2019 | Lee et al. | |
| 2019/0146209 | A1 * | 5/2019 | Inada | G02B 26/101 385/25 |
| 2019/0187257 | A1 | 6/2019 | Otsuka et al. | |
| 2019/0391271 | A1 * | 12/2019 | Goodwill | G01S 17/10 |
| 2019/0391459 | A1 | 12/2019 | Shin et al. | |
| 2020/0049819 | A1 | 2/2020 | Cho et al. | |
| 2020/0103679 | A1 | 4/2020 | Lee et al. | |
| 2020/0174104 | A1 | 6/2020 | Kim et al. | |
| 2020/0284904 | A1 | 9/2020 | Lee et al. | |
| 2021/0088813 | A1 | 3/2021 | Lee et al. | |

FOREIGN PATENT DOCUMENTS

| | | | | |
|---|---|---|---|---|
| JP | 2001-281609 | A | | 10/2001 |
| JP | 2002-359534 | A | | 12/2002 |
| JP | 2005294510 | A | * | 10/2005 |
| JP | 200660035 | A | | 3/2006 |
| JP | 2006060035 | A | * | 3/2006 |
| JP | 2017-157657 | A | | 9/2017 |
| KR | 10-2017-0112915 | A | | 10/2017 |
| KR | 10-2018-0022100 | A | | 3/2018 |
| KR | 10-2018-0082308 | A | | 7/2018 |
| KR | 10-2019-0007755 | A | | 1/2019 |
| KR | 10-2020-0037639 | A | | 4/2020 |
| KR | 10-2020-0066947 | A | | 6/2020 |
| WO | 2018/128662 | A2 | | 7/2018 |

OTHER PUBLICATIONS

Goulding, David et al., "Quantum-Dot Phase Modulator Operating at 1300 nm", IEEE Journal of Selected Topics in Quantum Electronics, vol. 13, No. 5, Sep./Oct. 2007, pp. 1257-1260.

Rutckaia, Viktoriia et al., "Quantum dot emission driven by Mie resonances in silicon nanostructures", Nano Letters, Oct. 2, 2017. (27 pages total).

Office Action issued Apr. 18, 2023 by the European Patent Office in corresponding EP Patent Application No. 21184007.9.

Communication dated Nov. 5, 2021 issued by the European Patent Office in application No. 21184007.9.

Mukherjee, J., et al., "Laser power converters for space based power transfer applications", Technical Summaries of SPIE Photonics West 2011, XP055391641, pp. 22-23.

Qiao, P., et al., "Recent advances in high-contrast metastructures, metasurfaces and photonic crystals", ARXIV.org, 2017, XP081278855, pp. 1-58.

Communication dated Nov. 19, 2024, issued by the Korean Patent Office in Korean Application No. 10-2021-0031784.

Communication dated Apr. 1, 2025, issued by the Japanese Patent Office in Japanese Application No. 2021-107326.

Liu et al., "High-Speed InAs Quantum-Dot Electrooptic Phase Modulators", IEEE Photonics Technology Letters, 2011, vol. 23, No. 23, pp. 1748-1750 (3 pages total).

Communication dated Jul. 7, 2026, issued by the Chinese Patent Office in Chinese Application No. 10-202110759474.4.

* cited by examiner

LIGHT MODULATION ELEMENT, BEAM STEERING DEVICE INCLUDING THE SAME, AND ELECTRONIC DEVICE INCLUDING BEAM STEERING DEVICE

CROSS-REFERENCE TO RELATED APPLICATION

This application is based on and claims priority under 35 U.S.C. § 119 to Korean Patent Application No. 10-2020-0083604, filed on Jul. 7, 2020, in the Korean Intellectual Property Office, and Korean Patent Application No. 10-2021-0031784, filed on Mar. 11, 2021, in the Korean Intellectual Property Office the disclosures of which are incorporated by reference herein in their entireties.

BACKGROUND

1. Field

Example embodiments of the present disclosure relate to methods and apparatuses for a light modulation element, a beam steering device, and an electronic device.

2. Description of Related Art

A light modulation element for changing the transmission/reflection, polarization, phase, strength, path, etc., of incident light is used in various optical devices. To control the characteristics of light in a desired manner in an optical device, light modulation elements having various structures have been suggested.

For example, liquid crystal having optical anisotropy, a microelectromechanical system (MEMS) structure using fine mechanical movement of a light blocking/reflecting element, and the like have been widely used for general light modulation elements. These light modulation elements have a slow operation response time of several microseconds or more due to characteristics of a manner of operation thereof. Also, there is a method of modulating a phase of light by using the interference of multiple pixels or waveguide-type ray bundles using an optical phased array (OPA). Here, the pixels or waveguide are electrically or thermally controlled to adjust the phase of light.

When the MEMS structure using mechanical movement is used, a volume of the light modulation element increases, and the price increases. Further, the application of the method may be limited due to issues such as vibration.

In the control method using the OPA, an operation pixel needs to be in every pixel or waveguide, and an operation driver for a pixel operation part is necessary, which may complicate a circuit and an element and may increase the process cost.

Recently, there has been an attempt to apply a metasurface to a light modulation element. The metasurface is a structure in which a value less than a wavelength of incident light is applied to a thickness, a pattern, or a period. For example, optical devices having variable optical properties (e.g., a refractive index) and using a semiconductor material-based tunable metasurface having a multi-quantum well structure are used in various technical fields from optical communication to optical sensing.

SUMMARY

One or more example embodiments provide light modulation elements that independently control a gain and a phase of light.

One or more example embodiments also provide beam steering devices that independently control a gain and a phase of light.

One or more example embodiments also provide electronic devices including beam steering devices that independently control a gain and a phase of light.

However, problems to be resolved are not limited to these.

Additional aspects will be set forth in part in the description which follows and, in part, will be apparent from the description, or may be learned by practice of example embodiments.

According to an aspect of an example embodiment, there is provided a light modulation element including a first contact layer, a second contact layer, an active layer provided between the first contact layer and the second contact layer, a first contact plug provided between the first contact layer and the active layer, and a second contact plug provided between the second contact layer and the active layer, wherein a width of at least one of the first contact plug and the second contact plug is less than a width of the active layer.

The active layer may include a plurality of quantum dot layers stacked in a direction perpendicular to an upper surface of the first contact layer, and a plurality of well layers provided respectively on the plurality of quantum dot layers, wherein a width of the active layer is less than a wavelength of light incident on the active layer, and a band gap energy of the plurality of quantum dot layers is less than a band gap energy of the plurality of well layers.

The light modulation element may further include a first insulation film provided between the first contact layer and the active layer, and a second insulation film provided between the second contact layer and the active layer, wherein the first insulation film is provided adjacent to the first contact plug, and wherein the second insulation film is provided adjacent to the second contact plug.

A refractive index of the first insulation film and a refractive index of the second insulation film may be lower than a refractive index of the first contact plug and a refractive index of the second contact plug, respectively.

The light modulation element may further include a passivation film provided on the first contact layer, wherein the passivation film is provided adjacent to the first contact layer, the first insulation film, the active layer, the second insulation film, and the second contact layer.

The first insulation film and the second insulation film may include a first oxide, and wherein the passivation film may include an electrically insulating material which is different from the first oxide.

The light modulation element may further include a first charge injection layer provided between the active layer and the first contact plug, and a second charge injection layer provided between the active layer and the second contact plug, wherein a width of the first charge injection layer and a width of the second charge injection layer are greater than a width of the first contact plug and a width of the second contact plug, respectively.

The first contact layer and the first charge injection layer may include gallium arsenide (GaAs) of a first conductive type, wherein the second contact layer and the second charge injection layer may include GaAs of a second conductive type that is different from the first conductive type, wherein the first contact plug may include aluminum gallium arsenide (AlGaAs) of the first conductive type, and wherein the second contact plug may include AlGaAs of the second conductive type.

The first contact layer, the first contact plug, and the first charge injection layer may include silicon (Si) of a first conductive type, wherein the second contact layer, the second contact plug, and the second charge injection layer may include Si of a second conductive type that is different from the first conductive type, wherein the active layer may include intrinsic Si, and wherein the plurality of quantum dot layers may include germanium (Ge).

A conductive type of the first contact layer, the first contact plug, and the first charge injection layer may be an n-type, wherein a conductive type of the second contact layer, the second contact plug, and the second charge injection layer may be a p-type, wherein the active layer may be intrinsic, and wherein a width of the first contact layer is greater than a width of the second contact layer.

The light modulation element may further include a p-type electrode provided on the second contact layer.

A conductive type of the first contact layer, the first contact plug, and the first charge injection layer may be a p-type, wherein a conductive type of the second contact layer, the second contact plug, and the second charge injection layer may be an n-type, wherein the active layer may be intrinsic, and wherein a width of the first contact layer may be greater than a width of the second contact layer.

The light modulation element may further include an n-type electrode provided on the second contact layer.

Each of the plurality of quantum dot layers may include a plurality of quantum dot patterns.

The active layer may further include a plurality of barrier layers, and wherein a quantum dot layer and a well layer adjacent to each other among the plurality of quantum dot layers and the plurality of well layers may be provided between a pair of adjacent barrier layers among the plurality of barrier layers.

The plurality of quantum dot layers may include intrinsic indium arsenide (InAs), wherein the plurality of well layers may include intrinsic indium gallium arsenide (InGaAs), and wherein the plurality of barrier layers may include intrinsic GaAs.

The second contact layer may include a high-concentration doping layer, and a low-concentration doping layer provided between the high-concentration doping layer and the second contact plug, wherein the high-concentration doping layer and the low-concentration doping layer have the same conductivity, and a doping concentration of the high-concentration doping layer is higher than a doping concentration of the low-concentration doping layer.

The light modulation element may further include a substrate provided on the first contact plug opposite to the first contact layer, and a reflection layer provided between the substrate and the first contact layer.

The reflection layer may include a distributed Bragg reflector (DBR) that includes a plurality of low-refractive-index layers and a plurality of high-refractive-index layers that are alternately stacked on one another.

According to another aspect of an example embodiment, there is provided a beam steering device including a first light modulation element, and a second light modulation element, wherein each of the first light modulation element and the second light modulation element includes a first contact layer, a plurality of nanostructures provided on the first contact layer, and a plurality of second contact layers respectively provided on the plurality of nanostructures, wherein each of the plurality of nanostructures includes a first contact plug, an active layer provided on the first contact plug, and a second contact plug provided on the active layer, and wherein a width of at least one of the first contact plug and the second contact plug is less than a width of the active layer.

The first contact layer of the first light modulation element and the first contact layer of the second light modulation element may be configured to receive a reference voltage, wherein each of the plurality of second contact layers of the first light modulation element may be configured to receive a first voltage, and wherein each of the plurality of second contact layers of the second light modulation element may be configured to receive a second voltage that is different from the first voltage.

The first contact layer of the first light modulation element and the first contact layer of the second light modulation element may be connected to each other.

The beam steering device may further include a substrate provided on the plurality of nanostructures of the first light modulation element opposite to the first contact layer of the first light modulation element, wherein the substrate extends onto the first contact layer of the second light modulation element.

The first contact layer of the first light modulation element and the first contact layer of the second light modulation element may be spaced apart from each other.

The beam steering device may further include a substrate provided on the plurality of nanostructures of the first light modulation element opposite to the first contact layer of the first light modulation element, wherein the substrate extends onto the first contact layer of the second light modulation element.

The plurality of second contact layers of the first light modulation element and the plurality of second contact layers of the second light modulation element may be configured to receive a reference voltage, wherein the first contact layer of the first light modulation element is configured to receive a first voltage, and wherein the first contact layer of the second light modulation element is configured to receive a second voltage that is different from the first voltage.

Each of the first light modulation element and the second light modulation element may further include an electrode provided on the plurality of second contact layers, wherein the electrode is electrically connected to the plurality of second contact layers.

The active layer may include a plurality of quantum dot layers stacked in a direction perpendicular to an upper surface of the first contact layer, and a plurality of well layers respectively provided on the plurality of quantum dot layers, wherein a width of the active layer is less than a wavelength of light incident on the plurality of nanostructures, and wherein a band gap energy of the plurality of quantum dot layers is less than a band gap energy of the plurality of well layers.

Each of the plurality of nanostructures of the first light modulation element and the plurality of nanostructures of the second light modulation element may further include a first insulation film provided adjacent to the first contact plug, and a second insulation film provided adjacent to the second contact plug.

Each of the first light modulation element and the second light modulation element may further include a passivation film provided on the first contact layer, wherein the passivation film provided adjacent to the plurality of nanostructures.

The beam steering device may further include a substrate provided on the plurality of nanostructures of the first light modulation element opposite to the first contact layer of the first light modulation element, and a reflection layer provided between the substrate and the first contact layer of the first light modulation element, wherein the substrate and the reflection layer extend onto the first contact layer of the second light modulation element.

The reflection layer may include a distributed Bragg reflector (DBR) including a plurality of low-refractive-index layers and a plurality of high-refractive-index layers alternately stacked on one another.

Each of the plurality of nanostructures of the first light modulation element and the plurality of nanostructures of the second light modulation element may further include a first charge injection layer provided between the active layer and the first contact plug, and a second charge injection layer provided between the active layer and the second contact plug, wherein a width of the first charge injection layer and a width of the second charge injection layer are respectively greater than a width of the first contact plug and a width the second contact plug.

According to another aspect of an example embodiment, there is provided an electronic device including a light source configured to emit light, a beam steering device configured to adjust a traveling direction of the light emitted from the light source and direct the light to an object, a sensor configured to receive light reflected from the object that is irradiated by the light, and a processor configured to analyze the light received by the sensor, wherein the beam steering device includes a first light modulation element and a second light modulation element, wherein each of the first light modulation element and the second light modulation element includes a first contact layer, a plurality of nanostructures provided on the first contact layer, and a plurality of second contact layers respectively provided on the plurality of nanostructures, wherein each of the plurality of nanostructures includes a first contact plug, an active layer provided on the first contact plug, and a second contact plug provided on the active layer, wherein a width of at least one of the first contact plug and the second contact plug is less than a width of the active layer.

According to another aspect of an example embodiment, there is provided a light modulation element including a first contact layer, a second contact layer, an active layer provided between the first contact layer and the second contact layer, the active layer including a plurality of quantum dot layers, a first contact plug provided between the first contact layer and the active layer, and a second contact plug provided between the second contact layer and the active layer, wherein a width of at least one of the first contact plug and the second contact plug is less than a width of the active layer.

BRIEF DESCRIPTION OF THE DRAWINGS

The above and/or other aspects, features, and advantages of example embodiments will be more apparent from the following description taken in conjunction with the accompanying drawings, in which:

FIG. 13 is a cross-sectional view of a beam steering device according to another example embodiment;

FIG. 14 is a cross-sectional view of a semiconductor device including a beam steering device according to another example embodiment;

FIG. 15 is a cross-sectional view of a semiconductor device including a beam steering device according to another example embodiment;

FIG. 17 is a cross-sectional view of a semiconductor device including a beam steering device according to another example embodiment.

DETAILED DESCRIPTION

Figure 1:
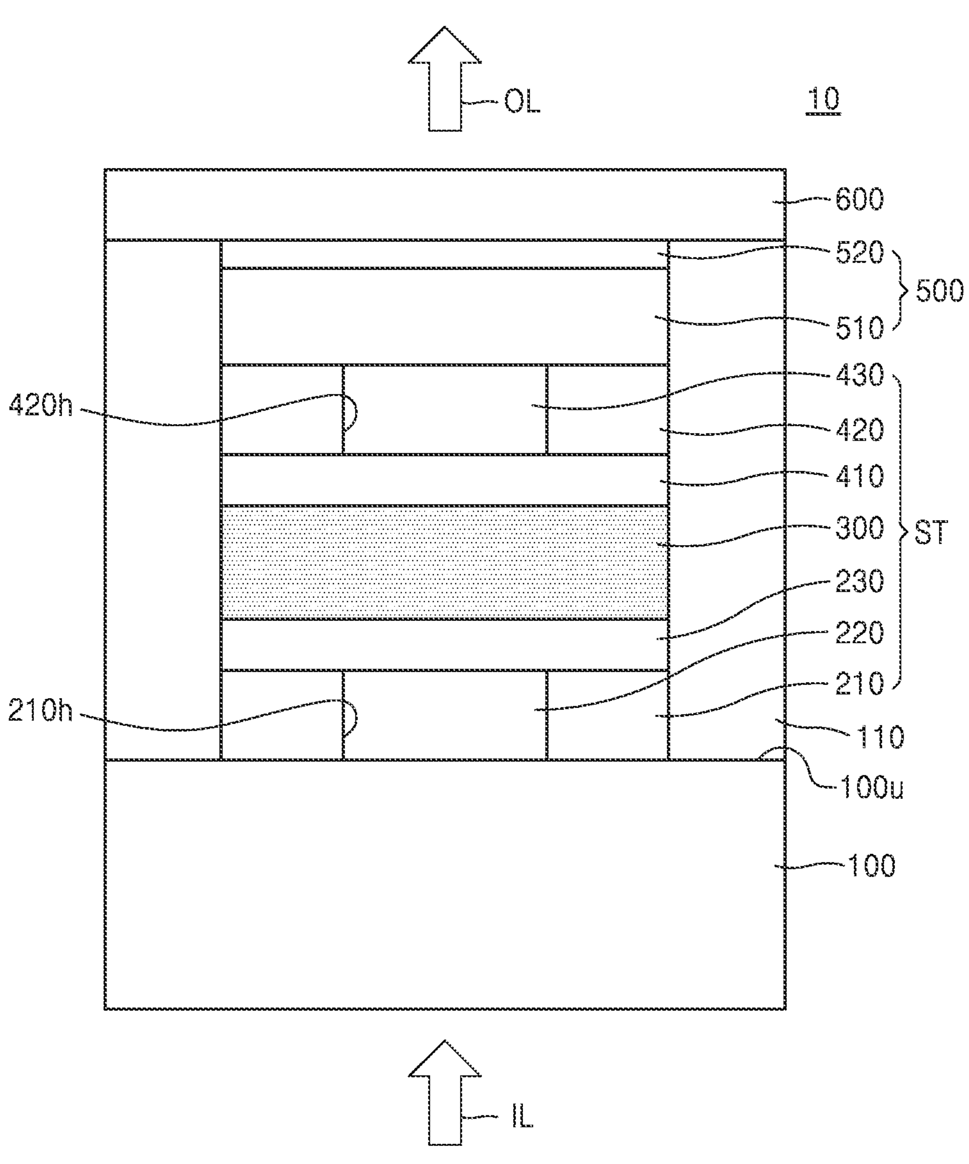
FIG. 1 is a cross-sectional view of a light modulation element according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will now be described in detail with reference to the accompanying drawings. In this regard, the example embodiments may have different forms and should not be construed as being limited to the descriptions set forth herein. Like reference numerals in the drawings denote like elements, and, in the drawings, the sizes of elements may be exaggerated for clarity and for convenience of explanation.

In a layer structure described below, an expression such as "above" or "on" may include not only the meaning of "immediately on/under/to the left/to the right in a contact manner", but also the meaning of "on/under/to the left/to the right in a non-contact manner".

An expression used in the singular encompasses the expression of the plural, unless it has a clearly different meaning in the context. Also, when a component "includes" an element, unless there is another opposite description thereto, it should be understood that the component does not exclude another element but may further include another element.

The use of the terms "a" and "an" and "the" and similar referents in the context of describing the inventive concept (especially in the context of the following claims) are to be construed to cover both the singular and the plural.

As used herein, light being deflected in one direction may denote that a traveling direction of light may have or may further have the one direction as a new component. For example, when the light traveling in a first direction is deflected in a second direction, the light may travel in a direction in which the first direction and the second direction are combined.

FIG. 1 is a cross-sectional view of a light modulation element 10 according to an example embodiment.

Referring to FIG. 1, the light modulation element 10 may include a first contact layer 100, a second contact layer 500, a nanostructure ST, a passivation film 110, and an electrode 600. The first contact layer 100 may include a semiconductor material, for example, a Group IV semiconductor material, for example, silicon (Si) or a compound semiconductor material, for example, gallium arsenide (GaAs). The first contact layer 100 may have a first conductive type, and a doping concentration of the first contact layer 100 may be, for example, about $2\times10^{18}$ $cm^{-3}$.

The nanostructure ST may be provided on the first contact layer 100, and a width of the nanostructure ST may be less than a width of the first contact layer 100. A width of the nanostructure ST may be measured by a magnitude that follows a direction parallel to an upper surface 100*u* of the first contact layer 100 and may be less than a wavelength of incident light IL that is incident to the light modulation element 10. For example, a width of the nanostructure ST may be about 600 nanometer (nm) or less. The nanostructure ST may include a first insulation film 210, a first contact plug 220, a first charge injection layer 230, the active layer 300, a second charge injection layer 410, a second insulation film 420, and a second contact plug 430.

The first insulation film 210 may be provided on the first contact layer 100. The first insulation film 210 may include an electrically insulating material, for example, an oxide (e.g., silicon oxide (SiOx) or aluminum oxide ($AlO_x$)). The first insulation film 210 may have a refraction index that is lower than a refractive index of each of the first contact layer 100, the first contact plug 220, and the first charge injection layer 230. The first insulation film 210 may include a first hole 210*h* penetrating the first insulation film 210 and exposing the first contact layer 100.

The first contact plug 220 may be provided in the first hole 210*h* and may fill the first hole 210*h*. As shown in FIG. 1, a width of the first contact plug 220 may be less than a width of the active layer 300. The first contact plug 220 may be electrically connected to the first contact layer 100. For example, the first contact plug 220 may penetrate the first insulation film 210 and directly contact the first contact layer 100. The first contact plug 220 may include a semiconductor material, for example, a Group IV semiconductor material (e.g., Si) or a compound semiconductor material (e.g., aluminum gallium arsenide ($Al_xGa_{1-x}As$)). When the first contact plug 220 includes $Al_xGa_{1-x}As$, x may be in a range of about 0.8 to about 0.98. For example, in GaAs containing gallium (Ga) and arsenide (As) at a ratio of 1:1, about 80 atomic percentage (at %) to about 98 at % of Ga may be substituted with aluminum (Al), and thus $Al_xGa_{1-x}As$ may be produced. The first contact plug 220 may have a first conductive type, and a doping concentration of the first contact plug 220 may be, for example, about $2\times10^{18}$ $cm^{-3}$.

The first charge injection layer 230 may be provided on the first contact plug 220 and may extend onto the first insulation film 210. The first charge injection layer 230 may include a semiconductor material, for example, a Group IV semiconductor material (e.g., Si) or a compound semiconductor material (e.g., GaAs). The first charge injection layer 230 may have a first conductive type, and a doping concentration of the first charge injection layer 230 may be lower than a doping concentration of the first contact plug 220. For example, a doping concentration of the first charge injection layer 230 may be about $1\times10^{17}$ $cm^{-3}$.

The active layer 300 may be provided on the first charge injection layer 230, and a width of the active layer 300 may be smaller than a wavelength of the incident light IL. For example, a width of the active layer 300 may be about 600 nm or less.

Figure 2:
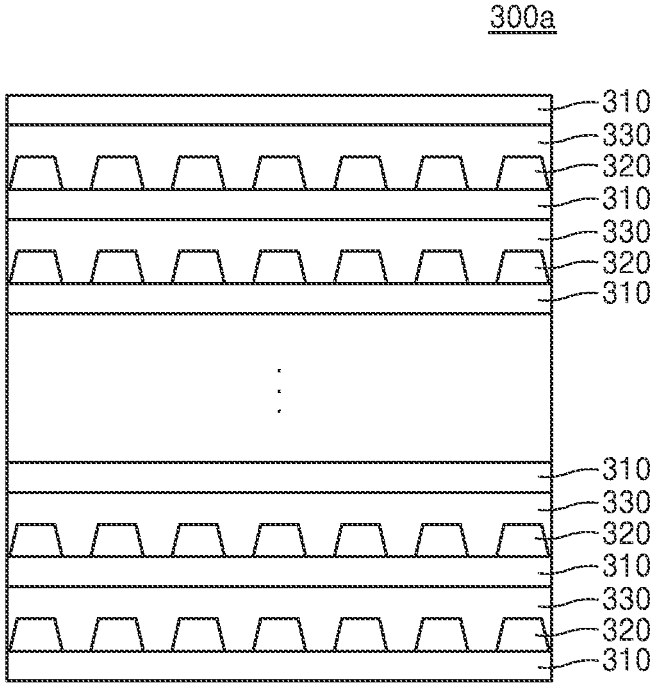
FIG. 2 is an active layer according to an example embodiment.

FIG. 2 is an active layer according to an example embodiment.

Referring to FIG. 2, an active layer 300*a*, according to an example embodiment, may include a plurality of barrier layers 310, a plurality of well layers 330, and a plurality of quantum dot layers. The plurality of barrier layers 310 may be stacked in a direction perpendicular to the upper surface 100*u* of the first contact layer 100 and may have a band gap energy that is greater than those of the well layers 330 and the quantum dot layers. The barrier layers 310 may include a compound semiconductor material having an intrinsic conductive type (e.g., GaAs). The well layers 330 may each be provided between the barrier layers 310 and may have a band gap energy that is greater than that of a quantum dot patterns 320. In this regard, the well layers 330 may have an electron and hole quantized energy level. The well layers 330 may include a compound semiconductor material having an intrinsic conductive type. For example, when the barrier layers 310 include GaAs, the well layers 330 may include indium gallium arsenide (InGaAs).

Each of the quantum dot layers may include the quantum dot patterns 320. A band gap energy of the quantum dot patterns 320 may be substantially the same with an energy of the incident light IL. The quantum dot patterns 320 may include a compound semiconductor material having an intrinsic conductive type. For example, when the barrier layers 310 include GaAs and the well layers 330 include InGaAs, the quantum dot patterns 320 may include indium arsenide (InAs).

Figure 3:
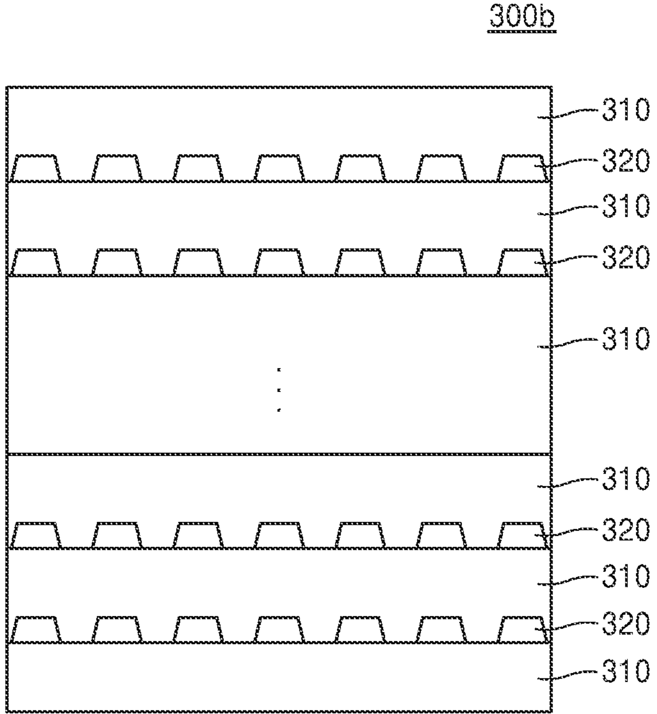
FIG. 3 is an active layer according to another example embodiment.

FIG. 3 is an active layer according to another example embodiment.

Referring to FIG. 3, unlike the active layer 300*a* shown in FIG. 2, an active layer 300*b* may not include the well layers 330 in FIG. 2. The active layer 300*b* of FIG. 3 may be an active layer 300*b* based on a Group IV semiconductor material, e.g., Si.

The barrier layers 310 and the quantum dot patterns 320 may include a Group IV semiconductor material. For example, the barrier layers 310 may include Si, and the quantum dot patterns 320 may include germanium (Ge).

Figure 4:
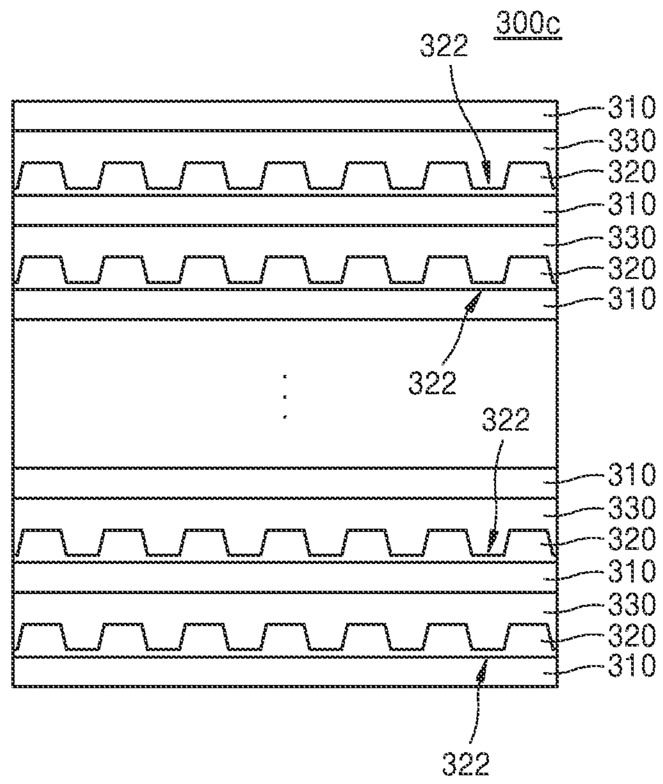
FIG. 4 is an active layer according to another example embodiment.

FIG. 4 is an active layer according to another example embodiment.

Referring to FIG. 4, unlike the active layer 300*a* or active layer 300*b* shown in FIG. 2 and FIG. 3, an active layer 300*c* may further include a connection film 322. The connection film 322 may be provided between the quantum dot patterns 320 and may connect the quantum dot patterns 320 to each other. As shown in FIG. 4, the connection film 322 may be provided between the barrier layers 310 and the well layers 330 and may include a material that is substantially the same as material included in the quantum dot patterns 320. The connection film 322 may include a semiconductor material having an intrinsic conductive type. For example, when the quantum dot patterns 320 include InAs or Ge, the connection film 322 may also include InAs or Ge.

Referring to FIG. 1, the second charge injection layer 410 may be provided on the active layer 300. The second charge injection layer 410 may include a semiconductor material, for example, a Group IV semiconductor material (e.g., Si) or a compound semiconductor material (e.g., GaAs). The second charge injection layer 410 may have a second conductive type, which is different from the first conductive type. A doping concentration of the second charge injection layer 410 may be lower than a doping concentration of the second contact plug 430 and may be, for example, about $1\times10^{17}$ $cm^{-3}$.

The second insulation film 420 may be provided on the second charge injection layer 410. The second insulation film 420 may include an electrically insulating material, for example, an oxide ($SiO_x$ or $AlO_x$). The second insulation film 420 may include a second hole 420*h* penetrating the second insulation film 420 and exposing the second charge injection layer 410.

The second contact plug 430 may be provided in the second hole 420*h* and may fill the second hole 420*h*. For example, the second contact plug 430 may penetrate the second insulation film 420 and directly and electrically connected to the second charge injection layer 410. The second contact plug 430 may include a semiconductor material, for example, a Group IV semiconductor material (e.g., Si) or a compound semiconductor material (e.g., $Al_xGa_{1-x}As$). When the second contact plug 430 includes $Al_xGa_{1-x}As$, x may be in a range of about 0.8 to about 0.98. In GaAs containing Ga and As at a ratio of 1:1, about 80 at % to about 98 at % of Ga may be substituted with Al and thus may produce $Al_xGa_{1-x}As$. The second contact plug 430 may have a second conductive type, and a doping concentration of the second contact plug 430 may be, for example, about $2\times10^{18}$ $cm^{-3}$.

The second contact layer 500 may be provided on the second contact plug 430 and may extend onto the second insulation film 420. The second contact layer 500 may include a low-concentration doping layer 510 and a high-concentration doping layer 520 that are sequentially stacked in that order. For example, the low-concentration doping layer 510 may be directly provided on the second contact plug 430 layer and the high-concentration doping layer 520 may be provided on the low-concentration doping layer 510. The low-concentration doping layer 510 and the high-concentration doping layer 520 may substantially include the same semiconductor material, for example, a Group IV semiconductor material (e.g., Si) or a compound semiconductor material (e.g., GaAs). The low-concentration doping layer 510 and the high-concentration doping layer 520 may have a second conductive type. A doping concentration of the low-concentration doping layer 510 may be, for example, about $2\times10^{18}$ $cm^{-3}$, and a doping concentration of the high-concentration doping layer 520 may be, for example, about $1\times10^{19}$ $cm^{3}$.

The passivation film 110 may be provided on the first contact layer 100 and may be provided adjacent to the nanostructure ST. For example, the passivation film 110 may be provided to surround sides of the nanostructure ST. The passivation film 110 may include an electrically insulating material, for example, $SiO_x$.

The electrode 600 may be provided on the second contact layer 500. A conductive type of the electrode 600 may be determined according to a conductive type of the second contact layer 500. When a conductive type of the second contact layer 500 is p-type (i.e., when the second conductive type is p-type), the electrode 600 may be a p-type electrode, for example, an indium tin oxide (ITO) electrode. When a conductive type of the second contact layer 500 is n-type (i.e., when the second conductive type is n-type), the electrode 600 may be an n-type electrode, for example, an electrode including gold (Au). When the electrode 600 includes gold (Au), the electrode 600 may be provided at a position off a light pathway of output light OL.

Hereinafter, characteristics of the light modulation element 10 will be described.

Figure 5:
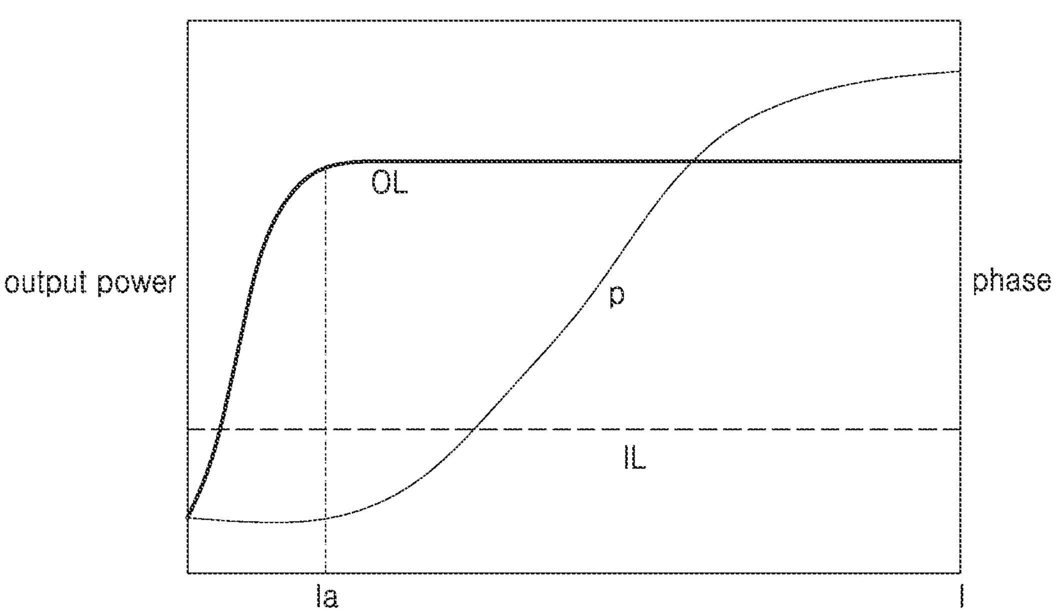
FIG. 5 is a graph that shows characteristics of the light modulation element of FIG. 1.

FIG. 5 is a graph that shows characteristics of the light modulation element of FIG. 1.

Referring to FIG. 5, an intensity of output light OL emitted from the light modulation element 10 may gradually increase as a current I supplied to the active layer 300 increases. However, an intensity of the output light OL may not increase at a current equal to or greater than a certain value Ia. The active layer 300 may have a saturation gain at a supplied current of a predetermined value Ia or greater. Such saturation is because the number of electrons capable of entering the ground state of a conduction band of the quantum dot patterns 320 and directly being involved in causing induced emission in the active layer 300 is limited. A refractive index and a phase p of the incident light IL may change in a region where the gain of the active layer 300 no longer increases, that is, a region where an intensity of the output light OL no longer increases.

As described above, the light modulation element 10 may continuously change a phase of incident light while having a saturation gain according to a current supplied thereto. The light modulation element 10 may further include a processor that independently controls a gain and a refractive index, and may independently control a refractive index and a gain of the active layer 300 by supplying a current to the active layer 300. The principle of the light modulation element 10 independently controlling a gain and a refractive index will be described.

Figure 6:
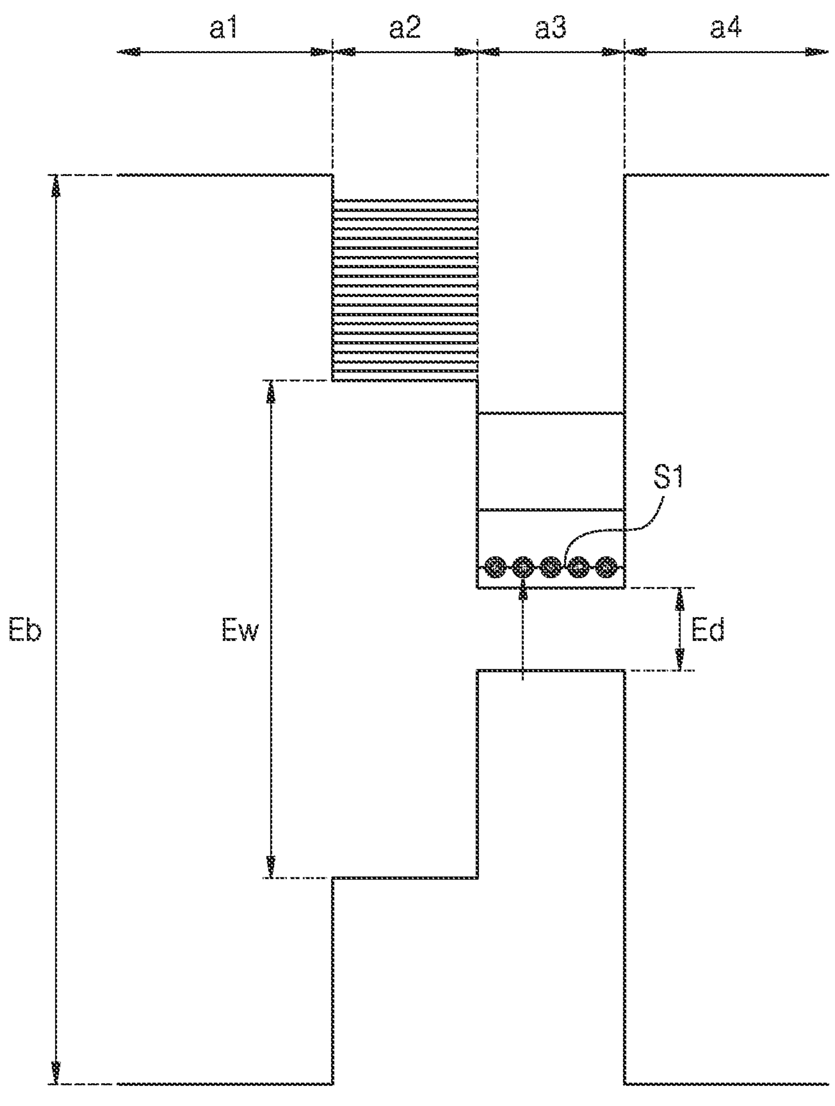
FIG. 6 schematically shows a process of density inversion occurring in the light modulation element of FIG. 1.

FIG. 6 schematically shows a process of density inversion occurring in the light modulation element of FIG. 1.

Referring to FIG. 6, a band gap energy Eb of barrier layers a1 and a4 may be greater than a band gap energy Ew of a well layer a2. The band gap energy Ew of the well layer a2 may be greater than a band gap energy Ed of a quantum dot pattern a3.

Electrons in a valence band of the quantum dot pattern a3 may migrate to a conduction band by receiving energy due to a current supplied to the active layer 300. For example, the electrons in a valence band of the quantum dot pattern a3 may receive energy and may be filled in a ground state Si of the conduction band. When a current equal to the band gap energy Ed of the quantum dot pattern a3 is supplied to the active layer 300, electrons of the valence band of the quantum dot pattern a3 receive energy and migrate to the conduction band, and thus density inversion may occur. When the current is continuously supplied, more electrons may migrate, and accordingly the occurrence of density inversion may further increase.

Figure 7:
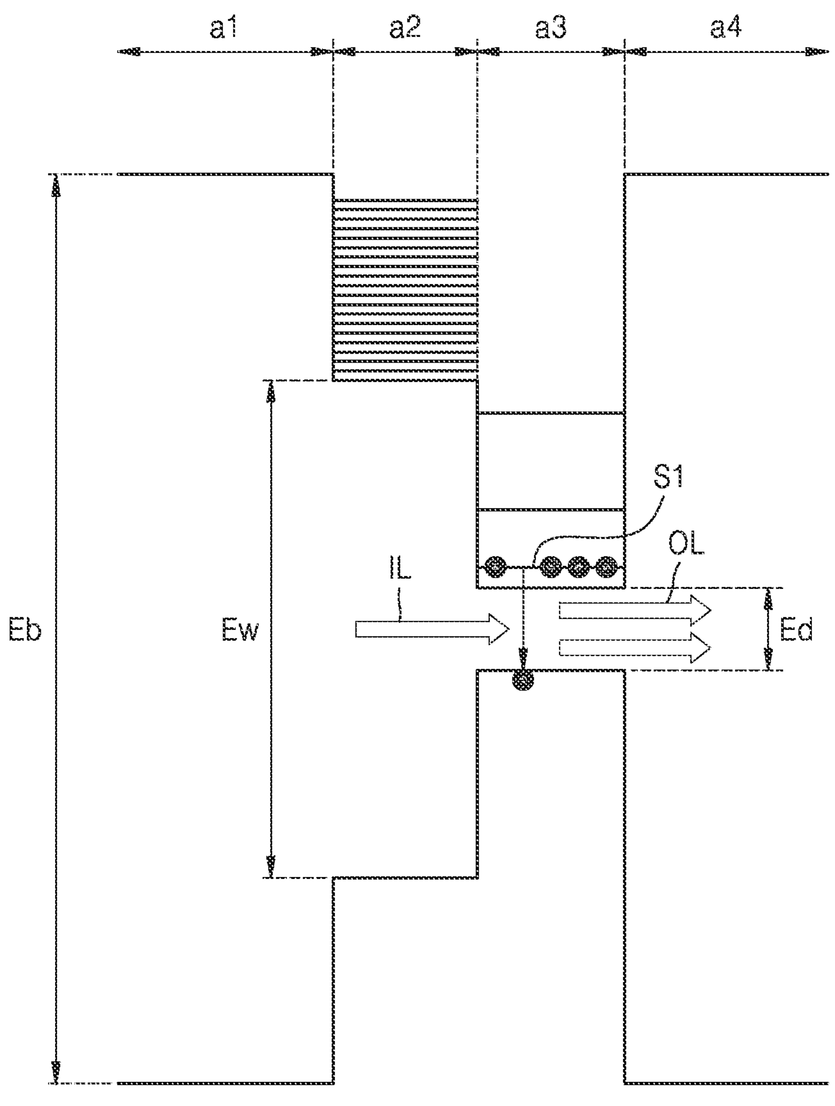
FIG. 7 schematically shows a process of induced emission occurring in the light modulation element of FIG. 1.

FIG. 7 schematically shows a process of induced emission occurring in the light modulation element of FIG. 1.

Referring to FIG. 7, when the incident light IL of a wavelength having the same energy as a band gap energy of the quantum dot pattern a3 in which the density inversion occurred is incident to the light modulation element 10, an intensity of the incident light IL may be amplified as stimulated emission occurs. Therefore, output light OL having an intensity greater than that of the incident light IL may output from the light modulation element 10. The stimulated emission may occur by electrons filled in the ground state Si of the conduction band of the quantum dot pattern a3. Because the number of electrons capable of being filled in the ground state Si is limited, the stimulated emission may not increase further even when a current is continuously supplied to the active layer 300. In this regard, an amplification rate with respect to the incident light IL may not increase to a certain value or higher and may be saturated. In other words, the active layer 300 may have a saturation gain when a current of a certain value or higher is supplied thereto.

Figure 8:
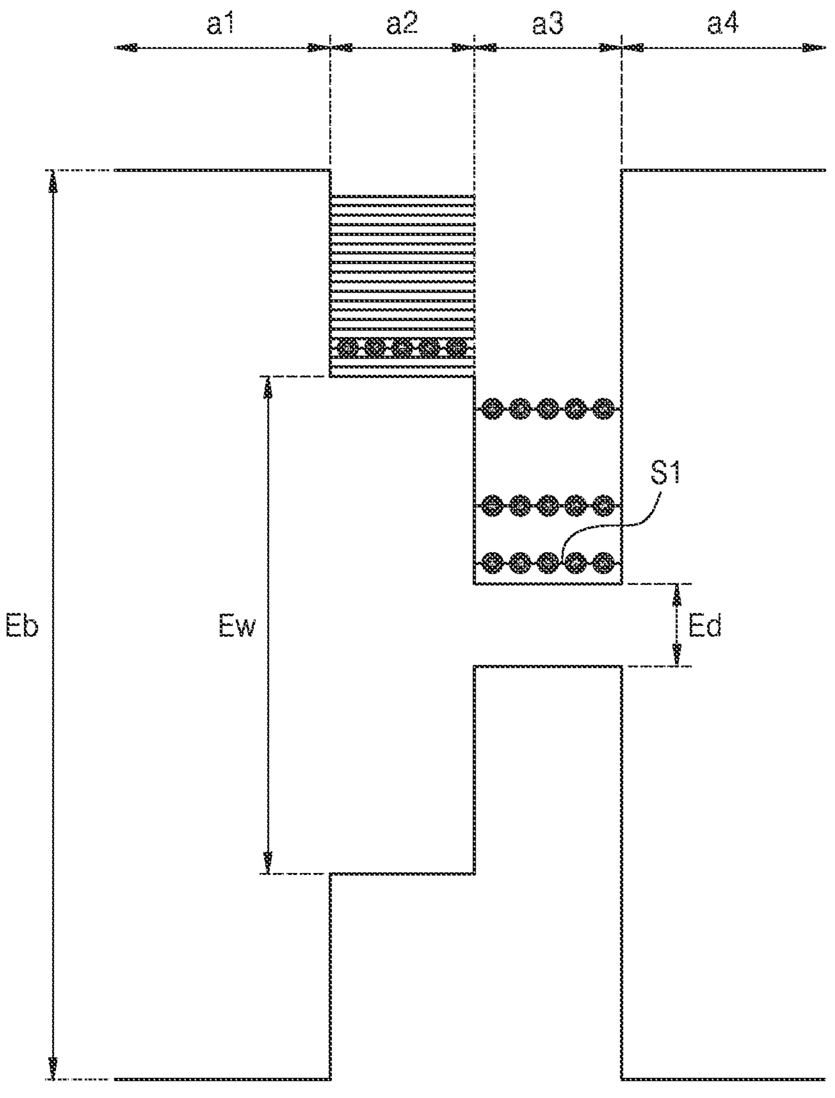
FIG. 8 schematically shows a process of a refraction index changing in the light modulation element of FIG. 1.

FIG. 8 schematically shows a process of a refraction index changing in the light modulation element of FIG. 1.

Referring to FIG. 8, while a magnitude of a current supplied to the active layer 300 increases, electrons may be filled in a plurality of quantized states of a quantum dot pattern a3 and a well layer a2. When a current is continuously supplied to the active layer 300 after the plurality of states of the quantum dot pattern a3 are all filled with electrons, electrons may continuously fill a plurality of states of the well layer a2, and a refractive index of the active layer 300 may change. As described above, the gain of the active layer 300 may be saturated.

As described above, when the gain of the active layer 300 reaches a certain value or more, the gain of the active layer 300 may not increase further but may be saturated despite an increase of the supplied current. Even when the gain of the active layer 300 is saturated, the refractive index of the active layer 300 may continuously change as a current is continuously supplied to the active layer 300. In this regard, a gain and a phase of light may be independently controlled by supplying a current to the active layer 300.

According to an example embodiment, a transmissive-type light modulation element 10 may independently control a gain and a phase of light.

FIGS. 9 to 12 are cross-sectional views illustrating a method of forming the light modulation element 10 described with reference to FIGS. 1 to 4. For the simplicity of the description, descriptions that are substantially the same as those given with reference to FIGS. 1 to 4 may be omitted.

Figure 9:
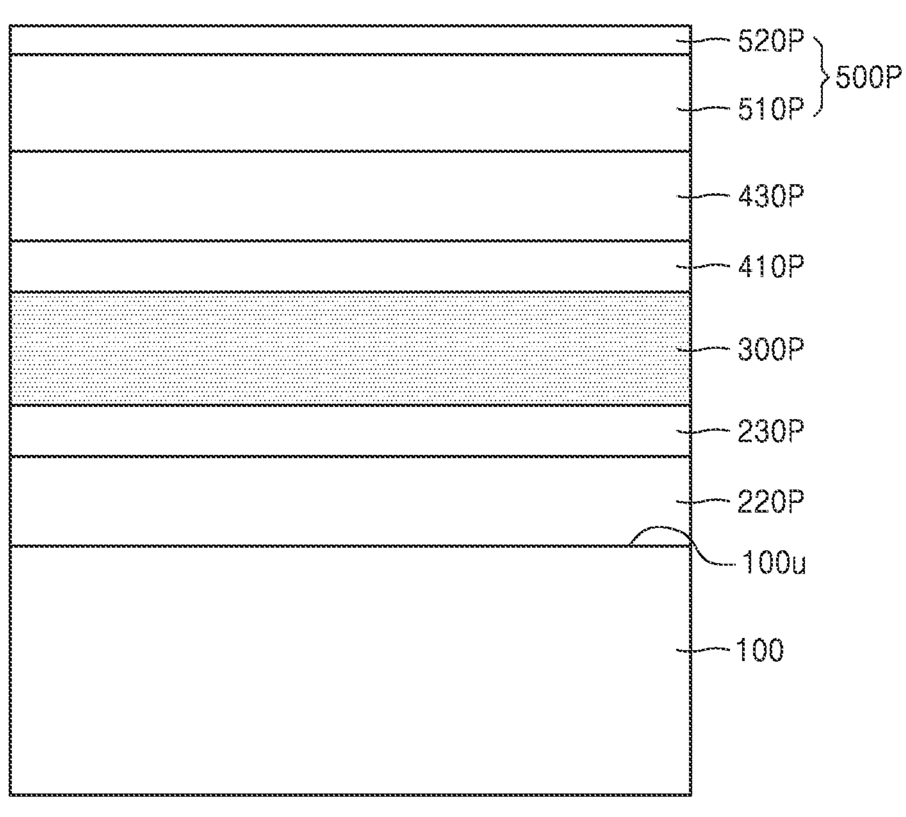
FIGS. 9, 10, 11, and 12 are cross-sectional views illustrating a method of preparing the light modulation element described with reference to FIGS. 1 to 4.

Referring to FIG. 9, a preliminary first contact plug layer 220P, a preliminary first charge injection layer 230P, a preliminary active layer 300P, a preliminary second charge injection layer 410P, a preliminary second contact plug layer 430P, and a preliminary second contact layer 500P may be formed on a first contact layer 100. The preliminary active layer 300P may include a plurality of preliminary barrier layers, a plurality of preliminary well layers, and a plurality of preliminary quantum dot layers. The preliminary second contact layer 500P may include a preliminary low-concentration doping layer 510P and a preliminary high-concentration doping layer 520 P sequentially stacked on the preliminary second contact plug layer 430P. The first contact layer 100, the preliminary first contact plug layer 220P, the preliminary first charge injection layer 230P, the preliminary active layer 300P, the preliminary second charge injection layer 410P, the preliminary second contact plug layer 430P, and the preliminary second contact layer 500P may respectively include substantially the same materials as those of the first contact plug 220, the first charge injection layer 230, the active layer 300, the second charge injection layer 410, the second contact plug 430, and the second contact layer 500 described with reference to FIGS. 1 to 4.

Forming of the preliminary first contact plug layer 220P, the preliminary first charge injection layer 230P, the preliminary active layer 300P, the preliminary second charge injection layer 410P, the preliminary second contact plug layer 430P, and the preliminary second contact layer 500P may include sequentially depositing materials of these layers on the first contact layer 100. Examples of a deposition process may include a chemical vapor deposition (CVD) process, a physical vapor deposition (PVD) process, or an atomic layer deposition (ALD) process. Also, the preliminary first contact plug layer 220P, the preliminary first charge injection layer 230P, the preliminary active layer 300P, the preliminary second charge injection layer 410P, the preliminary second contact plug layer 430P, and the preliminary second contact layer 500P may be formed by an epitaxial growth process, for example, by using a molecular beam epitaxy (MBE) process or metal organic chemical vapor deposition (MOCVD).

Figure 10:
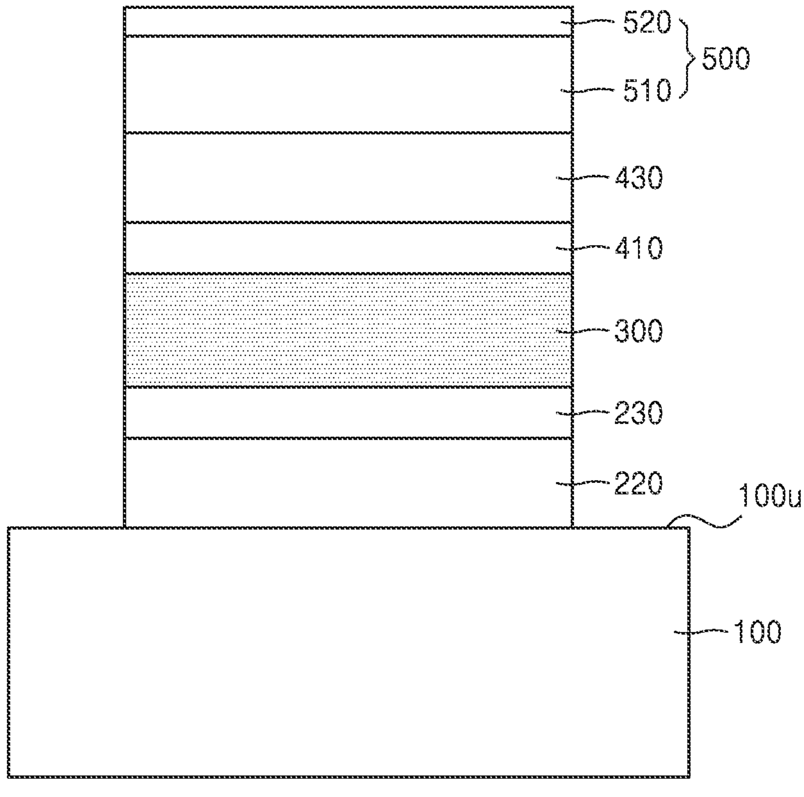

Referring to FIG. 10, the preliminary first contact plug layer 220P, the preliminary first charge injection layer 230P, the preliminary active layer 300P, the preliminary second charge injection layer 410P, the preliminary second contact plug layer 430P, and the preliminary second contact layer 500P may be patterned by an anisotropic etching process using an etching mask provided on the preliminary second contact layer 500P until an upper surface 100*u* of the first contact layer 100 is exposed. The etching mask may be removed during the etching process or after the etching process. A first contact plug 220, a first charge injection layer 230, an active layer 300, a second charge injection layer 410, and a second contact plug 430 may be formed on the first contact layer 100 by the patterning process.

Figure 11:
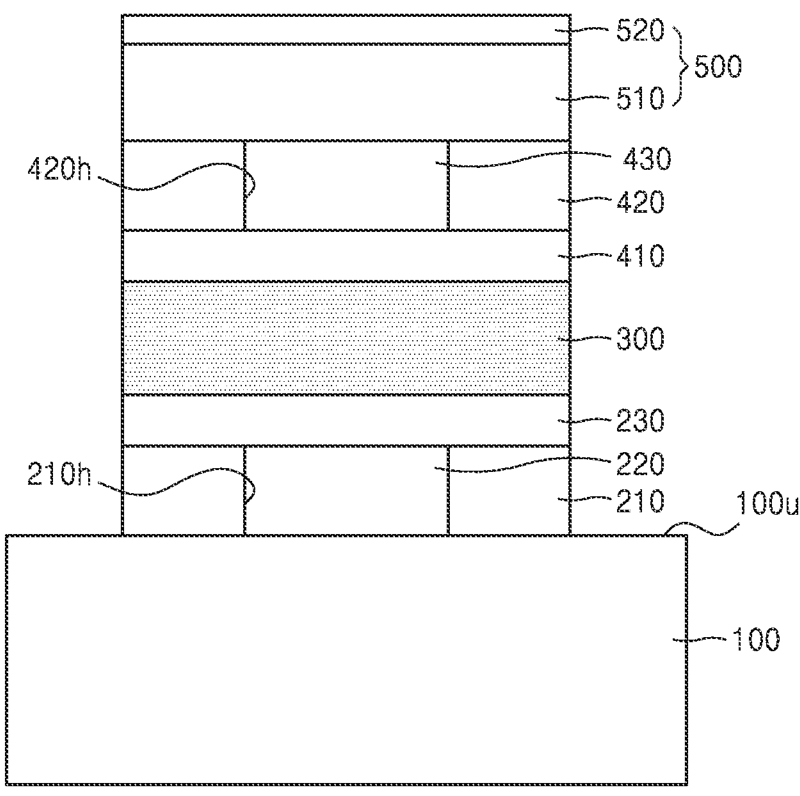

Referring to FIG. 11, an oxidation process may be performed on the first contact plug 220 and the second contact plug 430, and thus a first insulation film 210 surrounding the first contact plug 220 and a second insulation film 420 surrounding the second contact plug 430 may be formed. When the first contact plug 220 and the second contact plug 430 include Si or AlGaAs, the first insulation film 210 and the second insulation film 420 may include $SiO_x$ or $AlO_x$.

Figure 12:
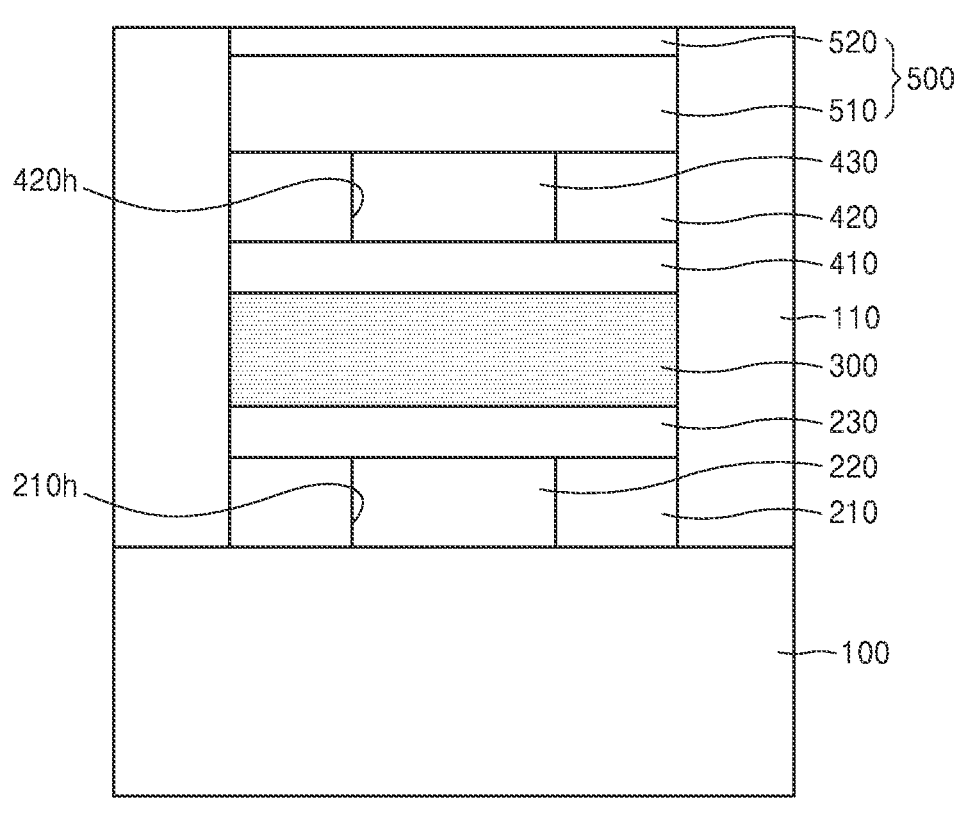

Referring to FIG. 12, a passivation film 110 described with reference to FIGS. 1 to 4 may be formed on the first contact layer 100. The passivation film 110 may be prepared by depositing an electrically insulating material (e.g., $SiO_x$) on the first contact layer 100 exposed by the patterning process described with reference to FIG. 9. Examples of the deposition process may include a CVD process, a PVD process, or an ALD process. Also, the passivation film 110 may be formed by an epitaxial growth process, for example, by using an MBE process or MOCVD.

Referring back to FIG. 1, the electrode 600 may be formed by the deposition process performed on the second contact layer 500. In an example embodiment, when a conductive type of the second contact layer 500 is p-type or n-type, an ITO electrode or a gold (Au electrode may be deposited on the second contact layer 500.

Figure 13:
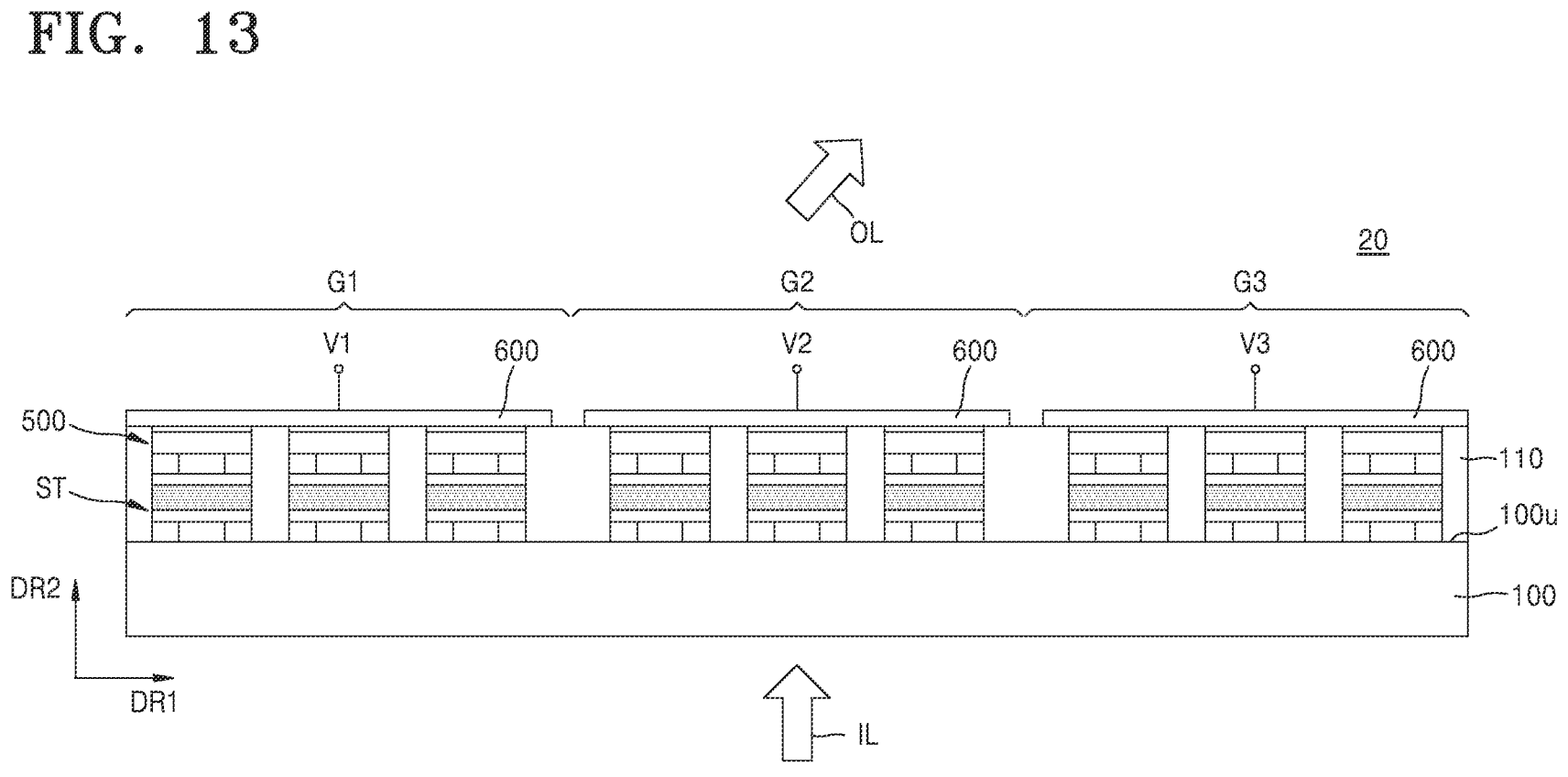

FIG. 13 is a cross-sectional view of a beam steering device 20 according to another example embodiment. For the simplicity of the description, descriptions that are substantially the same as those given with reference to FIGS. 1 to 4 may be omitted.

Referring to FIG. 13, the beam steering device 20 includes a first contact layer 100, a plurality of nanostructures ST, a plurality of second contact layers 500, a plurality of passivation films 110, and a plurality of electrodes 600. A conductivity of the first contact layer 100 may be n-type, and a reference voltage (or a ground voltage) may be applied to the first contact layer 100.

Nanostructures ST may be arranged in a first direction DR1 parallel to an upper surface 100*u* of the first contact layer 100. A conductive type of a first contact plug 220 and a first charge injection layer 230 of the nanostructures ST may be n-type, and a conductive type of a second charge injection layer 410 and a second contact plug 430 of the nanostructures ST may be p-type.

The second contact layers 500 may be respectively provided on the nanostructures ST. Each of the second contact layers 500 may include a low-concentration doping layer and a high-concentration doping layer that are sequentially stacked.

Each of the passivation films 110 described with reference to FIGS. 1 to 4 may be provided between two of the nanostructures ST.

The electrodes 600 may be provided on the second contact layers 500 and the passivation films 110. Each of the electrodes 600 may correspond to some of the second contact layers 500. Although each of the electrodes 600 is shown as corresponding to three of the second contact layers 500, this is only an example, and the number of second contact layers 500 corresponding to each of the electrodes 600 may be determined according to the need. The electrodes 600 may be electrically connected to the second contact layers 500. For example, the electrodes 600 may directly contact the high-concentration doping layers 520 of the corresponding second contact layers 500. Different voltages, for example, a first voltage V1, a second voltage V2, and a third voltage V3, may be applied to the electrodes 600.

The beam steering device 20 may include light modification groups G1, G2, and G3. One of the light modification groups G1, G2, and G3 may include a light modulation elements of which degrees of light amplification and degrees of phase modification with respect to incident light IL may be the same. For example, FIG. 13 illustrates a first light modification group G1, a second light modification group G2, and a third light modification group G3.

Control elements, for example, thin film transistors that apply a voltage to the electrodes 600, controlling each of the light modification groups G1, G2, and G3 may be provided on the first contact layer 100. For example, the control elements may be provided between the light modification groups G1, G2, and G3.

The incident light IL incident on the beam steering device 20 may be provided to the light modification groups G1, G2, and G3, which are different from each other. The incident light IL may be modified differently by the light modification groups G1, G2, and G3. In this regard, the output light OL may include parts having different phases, and thus, may be deflected in a direction different from that of the incident light IL.

According to one or more example embodiments, a transmissive-type beam steering device 20 may independently control a gain and a phase of light and including light modification groups G1, G2, and G3.

Figure 14:
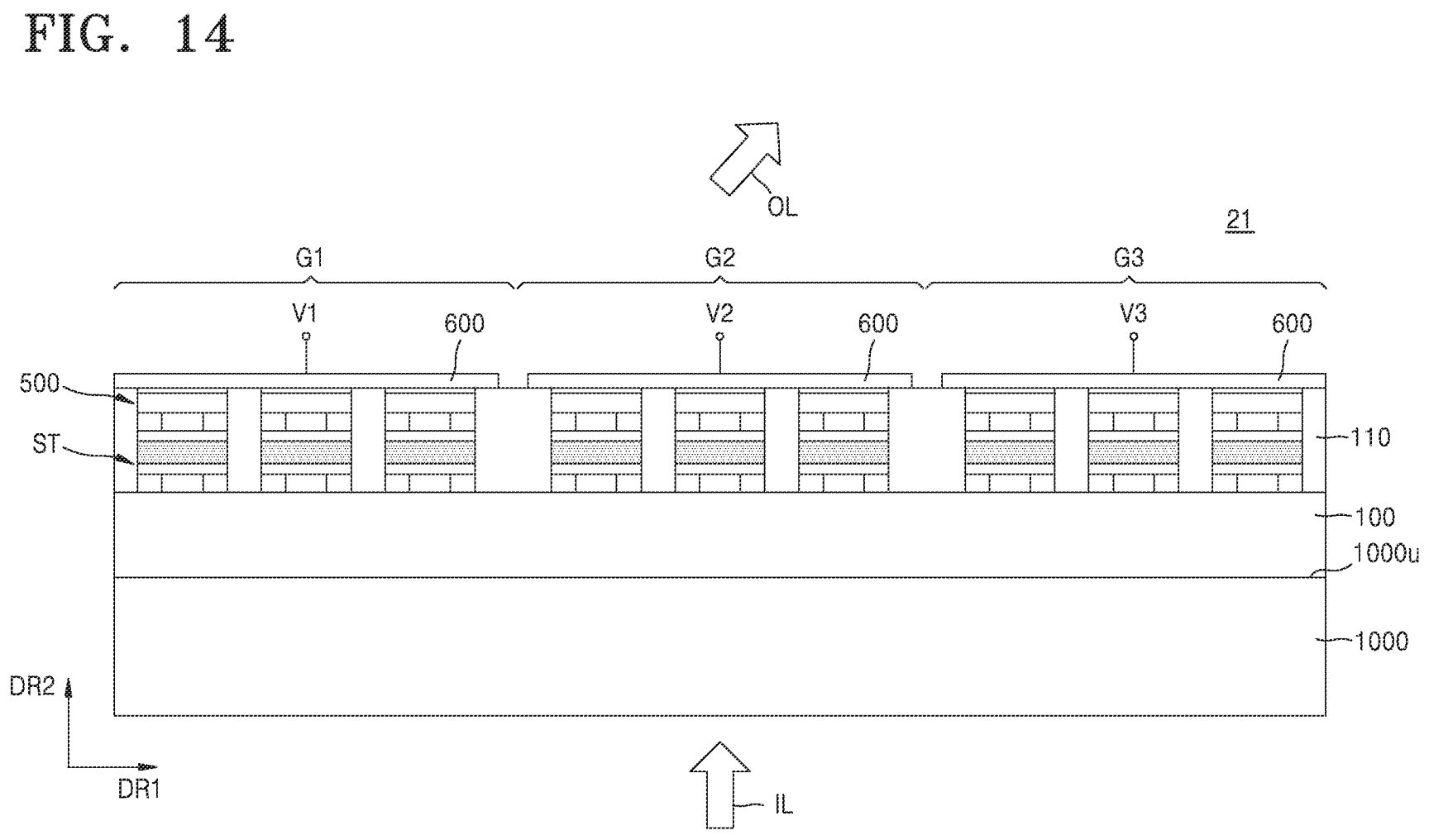

FIG. 14 is a cross-sectional view of a semiconductor device including a beam steering device 21 according to another example embodiment. For the simplicity of the description, descriptions that are the same as those given with reference to FIG. 13 may be omitted.

A beam steering device 21 according to an example embodiment of FIG. 14 may further include a substrate 1000 in addition to the beam steering device 20 of the example embodiment of FIG. 13. The substrate 1000 may be provided in contact with the first contact layer 100 opposite to the nanostructures ST and may be a semiconductor device layer that controls the beam steering device 21. The substrate 1000 may include wires, electronic devices, and insulation films, and the electronic devices may control each of the light modification groups G1, G2, and G3. The substrate 1000 may include a seed layer for growing the first contact layer 100.

Figure 15:
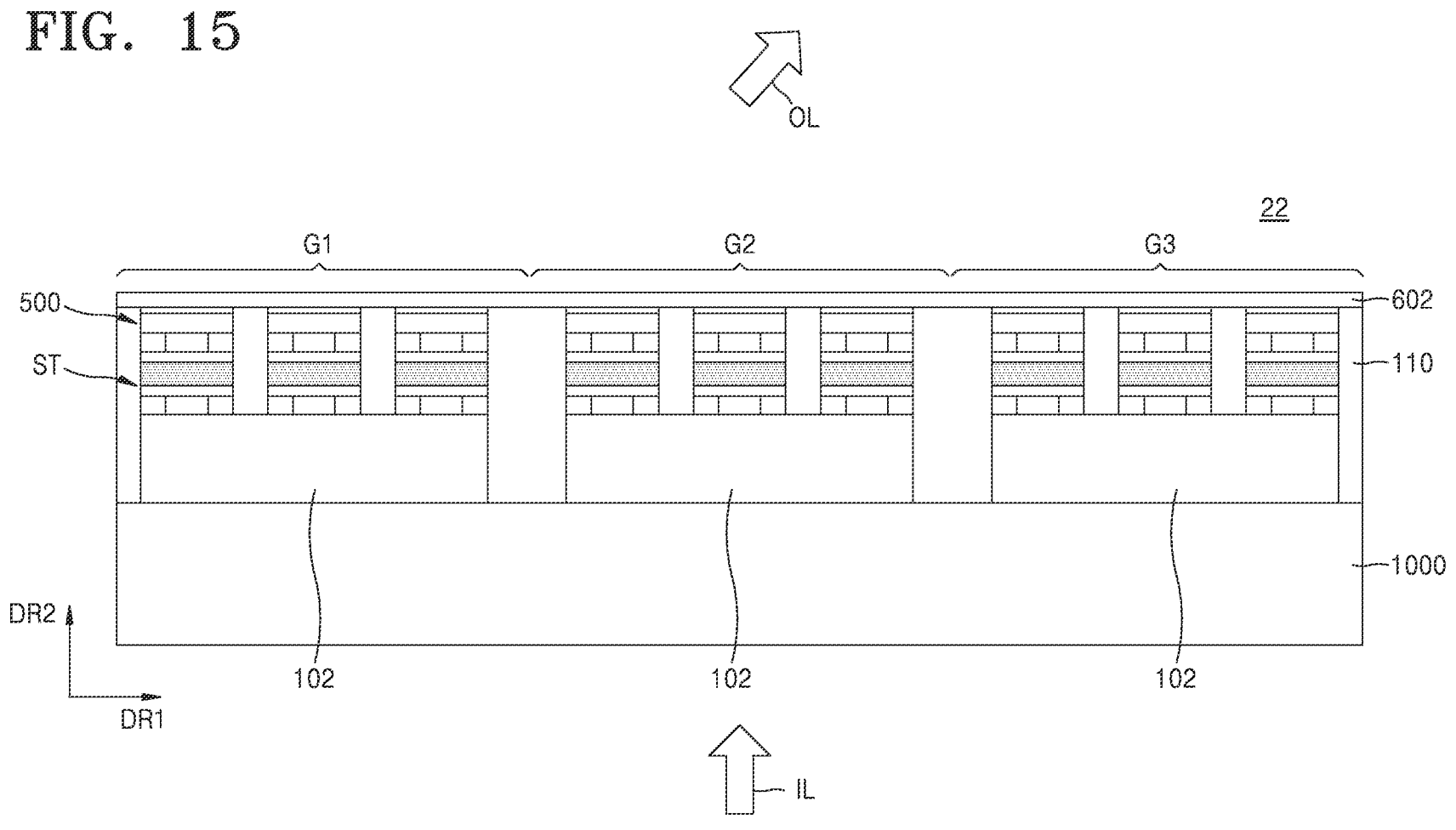

FIG. 15 is a cross-sectional view of a semiconductor device including a beam steering device 22 according to another example embodiment. For the simplicity of the description, descriptions that are the same as those given with reference to FIG. 14 may be omitted.

Referring to FIG. 15, the first contact layers 102 may be arranged apart from one another in a first direction DR1 parallel to an upper surface of the substrate 1000. Each of the first contact layers 102 may be substantially the same as the first contact layer 100 described with reference to FIG. 1.

Some of the nanostructures ST may be provided on each of the first contact layers 102. In FIG. 15, three of the nanostructures ST are shown as provided on each of the first contact layers 102, but this is an example, and embodiments are not limited thereto.

Each of the passivation films 110 may be provided between the nanostructures ST, and the passivation films 110 may fill regions between the first contact layers 102. The passivation films 110 may be substantially the same as the passivation films 110 described with reference to FIGS. 1 to 4.

The electrode 602 may be provided on the second contact layers 500 and the passivation films 110 and may correspond to all of the second contact layers 500. The electrode 602 may be an n-type electrode, for example, a gold (Au) electrode. The electrode 602 may be electrically connected to the second contact layers 500 and, for example, may directly contact the high-concentration doping layers of the second contact layers 500.

A reference voltage (or a ground voltage) may be applied to the electrode 602. Different voltages, such as the first to third voltages V1, V2, and V3 described with reference to FIG. 13 may be applied to the first contact layers 102, respectively. Therefore, the light modification groups G1, G2, and G3 of the beam steering device 22 may each be defined by the first contact layers 102.

Figure 16:
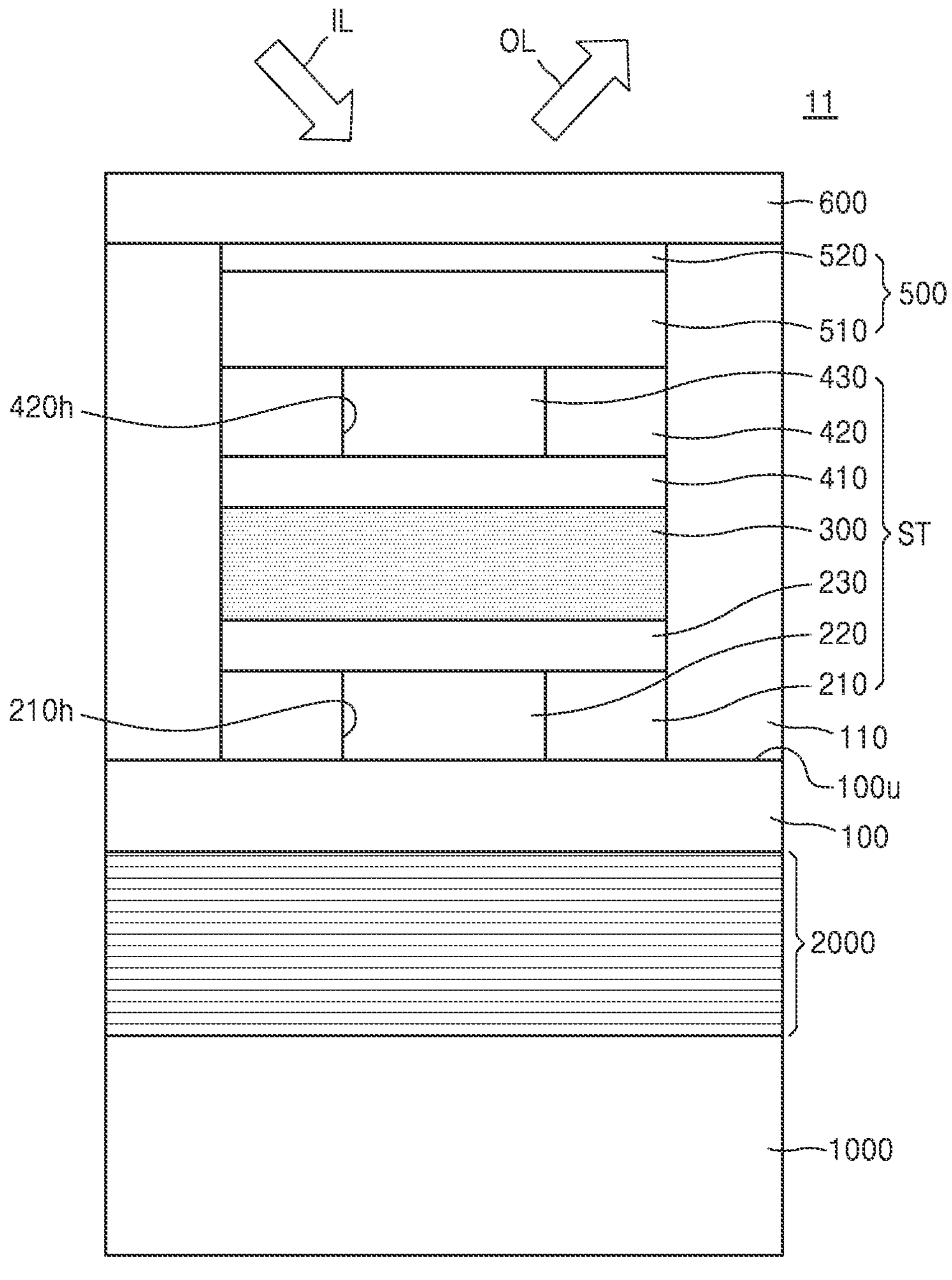
FIG. 16 is a cross-sectional view of a light modulation element according to another example embodiment.

FIG. 16 is a cross-sectional view of a light modulation element 11 according to another example embodiment. For the simplicity of the description, descriptions that are the same as those given with reference to FIGS. 1 to 4 may be omitted.

A light modulation element 11 according to an example embodiment of FIG. 16 further includes a substrate 1000 and a reflection layer 2000 in addition to a light modulation element 10 according to an example embodiment of FIG. 1. The substrate 1000 may be a semiconductor device layer that controls the light modulation element 11. For example, the substrate 1000 may include wires, electronic devices, and insulation films.

The reflection layer 2000 may be provided in contact with the first contact layer 100 opposite to the nanostructure ST. The reflection layer 2000 may include a distributed Bragg reflector including a plurality of low-refractive-index layers and a plurality of high-refractive-index layers that are alternately stacked on one another. Light incident to the distributed Bragg reflector may be reflected at boundaries between the low-refractive-index layers and the high-refractive-index layers. Thicknesses of the low-refractive-index layers and the high-refractive-index layers may be determined such that constructive interference occurs between the reflected light. For example, the reflection layer 2000 may include a plurality of AlAs layers and a plurality of $Al_{0.5}Ga_{0.5}As$ layers alternately stacked on one another or may include a plurality of $Al_{0.9}Ga_{0.1}As$ layers and a plurality of $Al_{0.3}Ga_{0.7}As$ layers alternately stacked on one another.

Figure 17:
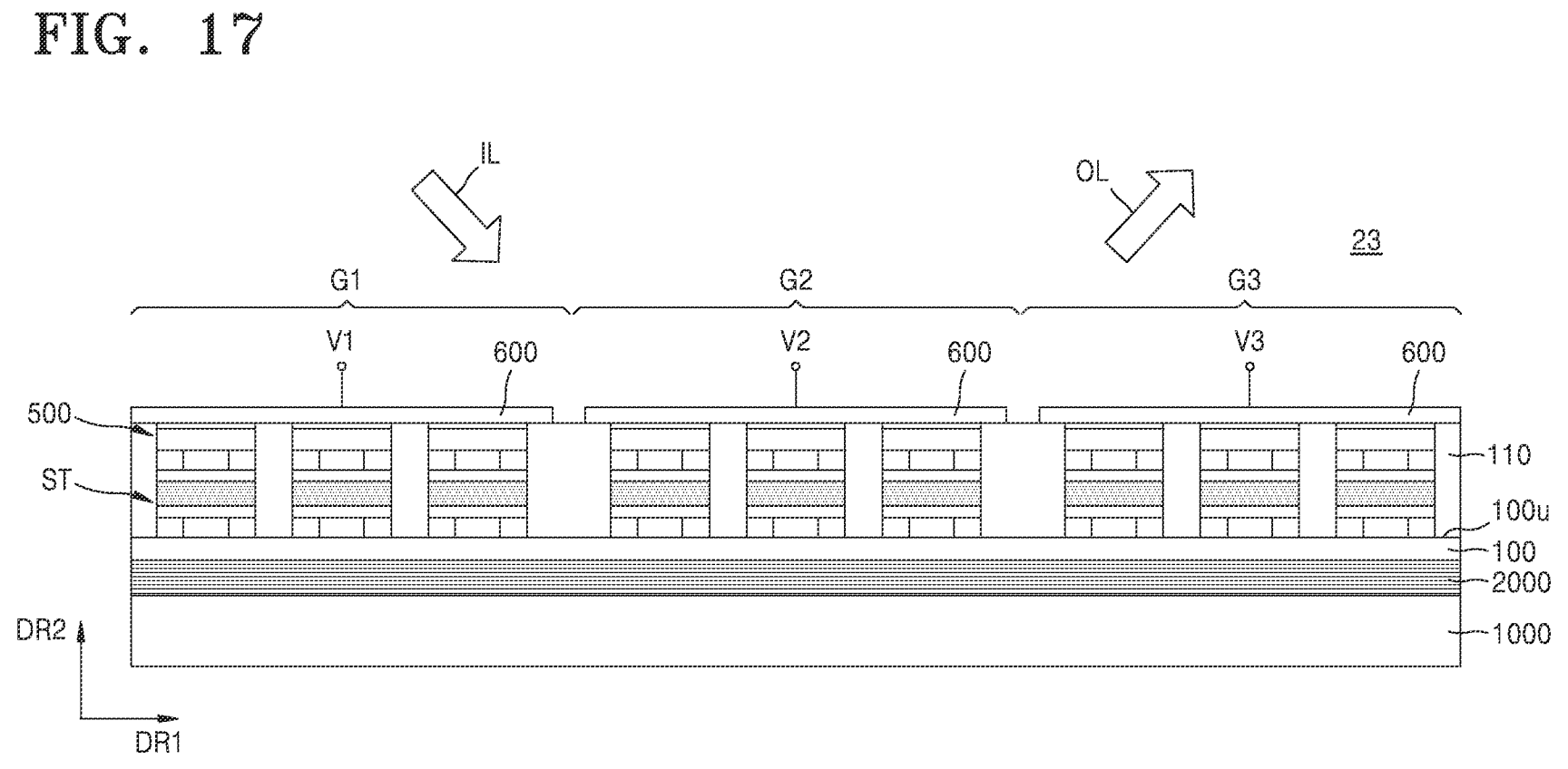

FIG. 17 is a cross-sectional view of a semiconductor device including a beam steering device 23 according to another example embodiment.

Figure 18:
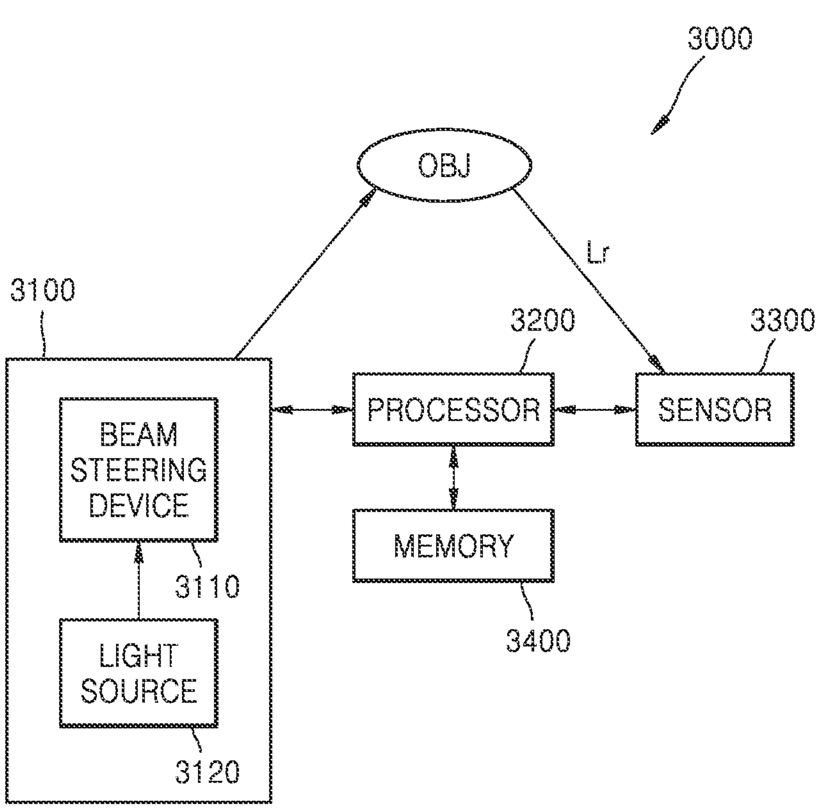
FIG. 18 is a block diagram illustrating a schematic structure of an electronic device according to an example embodiment.

FIG. 18 is a block diagram illustrating a schematic structure of an electronic device 3000 according to another example embodiment.

Referring to FIG. 18, the electronic device 3000 may include a lighting device 3100, which radiates light toward an object OBJ, a sensor 3300, which receives light reflected from the object OBJ, and a processor 3200, which performs an operation for obtaining information on the object OBJ from the light received by the sensor 3300. The electronic device 3000 may include a memory 3400 in which code or data for execution of the processor 3200 is stored.

The lighting device 3100 may include a light source 3120 and a beam steering device 3110. The light source 3120 may generate a source light, for example, pulsed lasers, for scanning the object OBJ. The beam steering device 3110 may change a traveling direction of the light from the light source 3120 to illuminate the object OBJ and may include one selected from the beam steering devices 20, 21, 22, and 23 of FIGS. 13, 14, 15, and 17.

Optical elements for changing or additionally modifying a direction of the light from the lighting device 3100 to face the object OBJ may further be provided between the lighting device 3100 and the object OBJ.

The sensor 3300 may sense light ($L_r$) reflected by the object OBJ and may include an array of light detection elements. The sensor 3300 may further include a spectroscopic element for analyzing light reflected from the object OBJ for wavelength.

The processor 3200 may perform an operation for obtaining information on the object OBJ from the light received by the sensor 3300 and may be entirely in charge of processing and controlling of the electronic device 3000. The processor 3200 may obtain and process information about the object OBJ, for example, 2-dimensional or 3-dimensional image information. Also, the processor 3200 may control driving of the light source 3120 in the lighting device 3100 or an operation of the sensor 3300 in general and, for example, may operate a value of a current supplied to light modulation elements in the lighting device 3100. The processor 3200 may also determine whether to authenticate a user based on information obtained from the object OBJ and may execute other applications.

In the memory 3400, code for execution in the processor 3200 may be stored. Also, various execution modules executed by the electronic device 3000 and data for this may be stored in the memory 3400. For example, program code for the processor 3200 to use in an operation of obtaining information of the object OBJ and code of an application module that may be executed by using information of the object OBJ may be stored. Also, the memory 3400 may further store a communication module, a camera module, a video play module, or an audio play module as programs for driving devices that may be additionally prepared in the electronic device 3000.

The operation results from the processor 3200, that is, information of the shape and location of the object OBJ may be transmitted to other devices or units as necessary. For example, the information on the object OBJ may be transmitted to a control unit of another electronic device or unit that uses the information on the object OBJ, for example, a display device, a printer, smartphones, mobile phones, personal digital assistants (PDAs), laptops, personal computers (PCs), various wearable devices, or other mobile or non-mobile computing devices. Examples of the memory 3400 may include a flash memory-type memory, a hard disk-type memory, a multimedia card micro-type memory, a card-type memory (e.g., an SD or XD memory), random access memory (RAM), static random access memory (SRAM), read-only memory (ROM), electrically erasable programmable read-only memory (EEPROM), programmable read-only memory (PROM), a magnetic memory, a magnetic disk, or an optical disk.

Examples of the electronic device 3000 may include a portable mobile communication device, a smart phone, a smart watch, a PDA, a laptop, a PC, other mobile or non-mobile computing devices, an autonomous driving device such as a driverless vehicle, an autonomous vehicle, a robot, or a drone, or an internet of things device.

According to one or more example embodiments, a light modulation element that independently controls a gain and a phase of light may be provided.

According to one or more example embodiments, a beam steering device that independently controls a gain and a phase of light may be provided.

According to one or more example embodiments, an electronic device including a beam steering device that independently controls a gain and a phase of light may be provided.

However, the effects of the embodiments are not limited to these descriptions.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A light modulation element comprising:

a first contact layer;

a second contact layer;

an active layer provided between the first contact layer and the second contact layer in a vertical direction;

a first contact plug provided between the first contact layer and the active layer in the vertical direction;

a second contact plug provided between the second contact layer and the active layer; and a first insulation film provided between the first contact layer and the active layer in the vertical direction and adjacent to the first contact plug in a horizontal direction, wherein a width of the first contact plug and a width of the second contact plug is less than a width of the active layer in the horizontal direction.

2. The light modulation element of claim 1, wherein the active layer comprises:

a plurality of quantum dot layers stacked in a direction perpendicular to an upper surface of the first contact layer; and a plurality of well layers provided respectively on the plurality of quantum dot layers, wherein the width of the active layer is less than a wavelength of light incident on the active layer, and a band gap energy of the plurality of quantum dot layers is less than a band gap energy of the plurality of well layers.

3. The light modulation element of claim 1, further comprising:

a first insulation film provided between the first contact layer and the active layer; and a second insulation film provided between the second contact layer and the active layer, wherein the first insulation film is provided adjacent to the first contact plug, and wherein the second insulation film is provided adjacent to the second contact plug.

4. The light modulation element of claim 3, wherein a refractive index of the first insulation film and a refractive index of the second insulation film are lower than a refractive index of the first contact plug and a refractive index of the second contact plug, respectively.

5. The light modulation element of claim 3, further comprising a passivation film provided on the first contact layer, wherein the passivation film is provided adjacent to the first contact layer, the first insulation film, the active layer, the second insulation film, and the second contact layer.

6. The light modulation element of claim 5, wherein the first insulation film and the second insulation film comprise a first oxide, and wherein the passivation film comprises an electrically insulating material which is different from the first oxide.

7. The light modulation element of claim 2, further comprising:

a first charge injection layer provided between the active layer and the first contact plug; and a second charge injection layer provided between the active layer and the second contact plug, wherein a width of the first charge injection layer and a width of the second charge injection layer are greater than the width of the first contact plug and the width of the second contact plug, respectively.

8. The light modulation element of claim 7, wherein the first contact layer and the first charge injection layer comprise gallium arsenide (GaAs) of a first conductive type, wherein the second contact layer and the second charge injection layer comprise GaAs of a second conductive type that is different from the first conductive type, wherein the first contact plug comprises aluminum gallium arsenide (AlGaAs) of the first conductive type, and wherein the second contact plug comprises AlGaAs of the second conductive type.

9. The light modulation element of claim 7, wherein the first contact layer, the first contact plug, and the first charge injection layer comprise silicon (Si) of a first conductive type, wherein the second contact layer, the second contact plug, and the second charge injection layer comprise Si of a second conductive type that is different from the first conductive type, wherein the active layer comprises intrinsic Si, and wherein the plurality of quantum dot layers comprise germanium (Ge).

10. The light modulation element of claim 7, wherein a conductive type of the first contact layer, the first contact plug, and the first charge injection layer is an n-type, wherein a conductive type of the second contact layer, the second contact plug, and the second charge injection layer is a p-type, wherein the active layer is intrinsic, and wherein a width of the first contact layer is greater than a width of the second contact layer.

11. The light modulation element of claim 10, further comprising:

a p-type electrode provided on the second contact layer.

12. The light modulation element of claim 7, wherein a conductive type of the first contact layer, the first contact plug, and the first charge injection layer is a p-type, wherein a conductive type of the second contact layer, the second contact plug, and the second charge injection layer is an n-type, wherein the active layer is intrinsic, and wherein a width of the first contact layer is greater than a width of the second contact layer.

13. The light modulation element of claim 7, further comprising:

an n-type electrode provided on the second contact layer.

14. The light modulation element of claim 2, wherein each of the plurality of quantum dot layers comprises a plurality of quantum dot patterns.

15. The light modulation element of claim 2, wherein the active layer further comprises a plurality of barrier layers, and wherein a quantum dot layer and a well layer adjacent to each other among the plurality of quantum dot layers and the plurality of well layers are provided between a pair of adjacent barrier layers among the plurality of barrier layers.

16. The light modulation element of claim 15, wherein the plurality of quantum dot layers comprise intrinsic indium arsenide (InAs), wherein the plurality of well layers comprise intrinsic indium gallium arsenide (InGaAs), and wherein the plurality of barrier layers comprise intrinsic GaAs.

17. The light modulation element of claim 1, wherein the second contact layer comprises:

a high-concentration doping layer; and a low-concentration doping layer provided between the high-concentration doping layer and the second contact plug, wherein the high-concentration doping layer and the low-concentration doping layer have the same conductivity, and wherein a doping concentration of the high-concentration doping layer is higher than a doping concentration of the low-concentration doping layer.

18. The light modulation element of claim 1, further comprising:

a substrate provided on the first contact plug opposite to the first contact layer; and a reflection layer provided between the substrate and the first contact layer.

19. The light modulation element of claim 18, wherein the reflection layer comprises a distributed Bragg reflector (DBR) that comprises a plurality of low-refractive-index layers and a plurality of high-refractive-index layers that are alternately stacked on one another.

20. A beam steering device comprising:

a first light modulation element; and a second light modulation element, wherein each of the first light modulation element and the second light modulation element comprises:

a first contact layer;

a plurality of nanostructures provided on the first contact layer in a vertical direction; and a plurality of second contact layers respectively provided on the plurality of nanostructures in the vertical direction, wherein each of the plurality of nanostructures comprises a first contact plug, an active layer provided on the first contact plug, and a second contact plug provided on the active layer, wherein a first insulation film is provided between the first contact layer and the active layer in the vertical direction and adjacent to the first contact plug in a horizontal direction, and wherein a width of the first contact plug and a width of the second contact plug is less than a width of the active layer in the horizontal direction.

21. The beam steering device of claim 20, wherein the first contact layer of the first light modulation element and the first contact layer of the second light modulation element are configured to receive a reference voltage, wherein each of the plurality of second contact layers of the first light modulation element is configured to receive a first voltage, and wherein each of the plurality of second contact layers of the second light modulation element is configured to receive a second voltage that is different from the first voltage.

22. The beam steering device of claim 20, wherein the first contact layer of the first light modulation element and the first contact layer of the second light modulation element are connected to each other.

23. The beam steering device of claim 22, further comprising a substrate provided on the plurality of nanostructures of the first light modulation element opposite to the first contact layer of the first light modulation element, wherein the substrate extends onto the first contact layer of the second light modulation element.

24. The beam steering device of claim 20, wherein the first contact layer of the first light modulation element and the first contact layer of the second light modulation element are spaced apart from each other.

25. The beam steering device of claim 24, further comprising a substrate provided on the plurality of nanostructures of the first light modulation element opposite to the first contact layer of the first light modulation element, wherein the substrate extends onto the first contact layer of the second light modulation element.

26. The beam steering device of claim 24, wherein the plurality of second contact layers of the first light modulation element and the plurality of second contact layers of the second light modulation element are configured to receive a reference voltage, wherein the first contact layer of the first light modulation element is configured to receive a first voltage, and wherein the first contact layer of the second light modulation element is configured to receive a second voltage that is different from the first voltage.

27. The beam steering device of claim 20, wherein each of the first light modulation element and the second light modulation element further comprises:

an electrode provided on the plurality of second contact layers, wherein the electrode is electrically connected to the plurality of second contact layers.

28. The beam steering device of claim 20, wherein the active layer comprises:

a plurality of quantum dot layers stacked in a direction perpendicular to an upper surface of the first contact layer; and a plurality of well layers respectively provided on the plurality of quantum dot layers, wherein the width of the active layer is less than a wavelength of light incident on the plurality of nanostructures, and wherein a band gap energy of the plurality of quantum dot layers is less than a band gap energy of the plurality of well layers.

29. The beam steering device of claim 20, wherein each of the plurality of nanostructures of the first light modulation element and the plurality of nanostructures of the second light modulation element further comprises:

a first insulation film provided adjacent to the first contact plug; and a second insulation film provided adjacent to the second contact plug.

30. The beam steering device of claim 29, wherein each of the first light modulation element and the second light modulation element further comprises:

a passivation film provided on the first contact layer, wherein the passivation film provided adjacent to the plurality of nanostructures.

31. The beam steering device of claim 30, further comprising a substrate provided on the plurality of nanostructures of the first light modulation element opposite to the first contact layer of the first light modulation element; and a reflection layer provided between the substrate and the first contact layer of the first light modulation element, wherein the substrate and the reflection layer extend onto the first contact layer of the second light modulation element.

32. The beam steering device of claim 31, wherein the reflection layer comprises a distributed Bragg reflector (DBR) comprising a plurality of low-refractive-index layers and a plurality of high-refractive-index layers alternately stacked on one another.

33. The beam steering device of claim 20, wherein each of the plurality of nanostructures of the first light modulation element and the plurality of nanostructures of the second light modulation element further comprises:

a first charge injection layer provided between the active layer and the first contact plug; and a second charge injection layer provided between the active layer and the second contact plug, wherein a width of the first charge injection layer and a width of the second charge injection layer are respectively greater than the width of the first contact plug and the width the second contact plug.

34. An electronic device comprising:

a light source configured to emit light;

a beam steering device configured to adjust a traveling direction of the light emitted from the light source and direct the light to an object;

a sensor configured to receive light reflected from the object that is irradiated by the light; and a processor configured to analyze the light received by the sensor, wherein the beam steering device comprises a first light modulation element and a second light modulation element, wherein each of the first light modulation element and the second light modulation element comprises:

a first contact layer;

a plurality of nanostructures provided on the first contact layer in a vertical direction; and a plurality of second contact layers respectively provided on the plurality of nanostructures in the vertical direction, wherein each of the plurality of nanostructures comprises a first contact plug, an active layer provided on the first contact plug, and a second contact plug provided on the active layer, wherein a first insulation film is provided between the first contact layer and the active layer in the vertical direction and adjacent to the first contact plug in a horizontal direction, and wherein a width of the first contact plug and a width of the second contact plug is less than a width of the active layer in the horizontal direction.

* * * * *